(12) United States Patent
Lee et al.

(10) Patent No.: US 11,560,070 B2
(45) Date of Patent: *Jan. 24, 2023

(54) DEVICE HAVING PUSH BUTTON SWITCH FOR OPERATING POWER SEAT OF VEHICLE

(71) Applicants: Hyundai Motor Company, Seoul (KR); Kia Corporation, Seoul (KR)

(72) Inventors: Baek Hee Lee, Suwon-si (KR); Keun Hui Kim, Uiwang-si (KR); Beom Young Oh, Anyang-si (KR); Hyuk Soo Kim, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/380,863

(22) Filed: Jul. 20, 2021

(65) Prior Publication Data
US 2022/0144138 A1    May 12, 2022

(30) Foreign Application Priority Data
Nov. 9, 2020 (KR) .......................... 10-2020-0148553

(51) Int. Cl.
*H01H 13/14* (2006.01)
*B60N 2/02* (2006.01)
*H01H 13/18* (2006.01)

(52) U.S. Cl.
CPC ......... *B60N 2/0228* (2013.01); *H01H 13/186* (2013.01); *H01H 2231/026* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703;
(Continued)

(56) References Cited

U.S. PATENT DOCUMENTS 5,668,357 A  *  9/1997  Takiguchi ............ B60N 2/0228
                                                    200/302.1
2010/0193340 A1*  8/2010  Ujimoto ............... B60N 2/0228
                                                    200/339
(Continued)

FOREIGN PATENT DOCUMENTS

JP       2009-269528 A       11/2009

*Primary Examiner* — Ahmed M Saeed
(74) *Attorney, Agent, or Firm* — Morgan, Lewis & Bockius LLP

(57) ABSTRACT

A device having push button switches for operating a power seat of a vehicle, includes a switch module in which a plurality of push button type switches for an input operation to drive a power seat to a target position and in a target direction are modularized; a plurality of touch sensors embedded in the plurality of push button type switches and configured to indicate operating directions of the power seat; a main controller configured to determine an operating direction of the power seat according to a sensing signal from a touch sensor in which a touch sensing operation is performed among the plurality of touch sensors; and a display configured to display the operating direction of the power seat determined by the main controller as one arrow and visually guide a user.

13 Claims, 19 Drawing Sheets

(58) Field of Classification Search
CPC ........ H01H 13/507; H01H 3/12; H01H 13/20; H01H 19/14; H01H 23/143; H01H 25/065; B60N 2/0228; B60N 2/12; B60N 2/22; B60N 2/6673; B60N 2/99; B60K 35/00; B60K 2370/131; B60K 2370/1446; B60K 2370/152; B60K 2370/162; B60K 2370/171
See application file for complete search history.

(56) References Cited

U.S. PATENT DOCUMENTS

2016/0193976 A1     7/2016   Wild et al.
2022/0153171 A1*   5/2022   Lee ...................... H01H 25/065

* cited by examiner

DEVICE HAVING PUSH BUTTON SWITCH FOR OPERATING POWER SEAT OF VEHICLE

CROSS-REFERENCE TO RELATED APPLICATION

The present application claims priority to Korean Patent Application No. 10-2020-0148553 filed on Nov. 9, 2020, the entire contents of which is incorporated herein for all purposes by this reference.

BACKGROUND OF THE INVENTION

Field of the Invention

The present invention relates to a device having a push button switch for operating a power seat of a vehicle. More particularly, it relates to a device having a push button switch for operating a power seat of a vehicle, which is capable of accurately displaying and guiding an operating direction of a power seat on a display according to a sensing operation of each of a plurality of touch sensors by embedding the plurality of touch sensors in a plurality of switches for an operation of the power seat.

Description of Related Art

Generally, as essential components, a power seat of a vehicle includes: a seat cushion for seating, a seatback against which the back of a passenger leans, and a headrest for supporting a neck and a head of the passenger. In addition to the above description, the power seat further includes: power mechanism components for adjusting a seat to various positions.

A switch module for adjusting the seat cushion and the seatback to various positions is provided at a side portion of the power seat.

The switch module employs a structure in which a switch for adjusting forward and backward movement of the seat, a switch for adjusting a height of the seat cushion, a switch for adjusting extension of a front portion of the seat cushion, a switch for adjusting a bolster angle of the seatback, a switch for adjusting reclining of the seatback, and a switch for adjusting a support direction of a lumbar support provided in the seatback are combined and arranged.

Furthermore, a touch sensor is embedded in each switch of the switch module so that, when a user touches the switch, a sensing operation of the touch sensor and a selection state and an operation direction of the switch may be displayed through a display around a driver seat.

Thus, the user can visually and easily recognize the selection state and the operation direction of the switch displayed on the display while keeping his or her eyes forward while driving.

In other words, since the user can visually and easily recognize the selection state and the operation direction of the switch displayed on the display, it is possible to solve inconvenience in which the user lowers his or her upper body, and simultaneously, turns his or her head toward the switch module to directly check the operation state of the switch module provided at the side portion of the seat.

Meanwhile, the switch module includes a first switch for a six-way adjustment including a forward and backward movement adjustment of an entirety of the seat (two-way), a front portion up and down adjustment of the seat cushion (two-way), and a vertical height adjustment of the seat cushion (two-way); a second switch for an extension adjustment (two-way) with respect to the front portion of the seat cushion; a third switch for a reclining adjustment of the seatback (two-way); a fourth switch for a bolster angle adjustment of the seatback (two-way); and a fifth switch for a support direction adjustment of a lumbar support (four-way).

Furthermore, a touch sensor may be embedded in each of the first to fifth switches.

Thus, when the user is configured to perform a touch operation in which the user touches a surface of one switch to be operated among the first to fifth switches, a sensing signal of a touch sensor embedded in a corresponding switch may be output to a controller including a processor, and then the controller may be configured to control an arrow, which guides an operating direction of the power seat according to the operation of the switch touched by the user, to be displayed on the display.

Thus, since the operating direction of the power seat according to the operation of the switch touched by the user is displayed on the display, the user can visually and easily recognize the operating direction of the power seat according to the operation of the switch.

For example, as shown in FIG. 18, when the user is configured to perform a touch operation in which the user touches the first switch for a six-way adjustment including a forward and backward movement adjustment of the seat (two-way), a front portion up and down adjustment of the seat cushion (two-way), and a vertical height adjustment of the seat cushion (two-way), the sensing operation of the touch sensor embedded in the first switch as well as a total of six arrows, which indicate the operating direction of the power seat according to the operation of the first switch, are simultaneously displayed on a display 200 so that the user can visually and easily recognize that the user is selecting the first switch.

However, even when the user touches any portion of the first switch, the total six arrows guiding the operating direction of the power seat due to the operation of the first switch are simultaneously displayed on the display so that there is a disadvantage in that an actual operating direction of the first switch and an actual operating direction of the power seat, which are desired by the user, are not accurately guided.

Similarly, even in the case of the second to fifth switches, even when the user touches any portion among the second switch to the fifth switch, all operating directions of the power seat according to operations of the second to fifth switches are simultaneously displayed on the display as arrows so that there is a disadvantage in that actual operating directions of the second to fifth switches and an actual operating direction of the power seat, which are desired by the user, are not accurately guided.

For example, as shown in FIG. 18, even when the user touches a surface of a rear end portion of the first switch to operate a forward movement adjustment of the power seat (e.g., an operation of pushing the first switch forward), a total of six arrows guiding an operating direction of the power seat according to the operation of the first switch are simultaneously displayed on the display 200, so it is possible for the user to recognize that the user is touching the first switch, but there is a disadvantage in that an operating direction of the first switch for the forward movement adjustment of the power seat and an operating direction of the power seat according to the operating of the first switch (e.g., the forward movement adjustment of power seat) are not accurately guided.

In other words, when the user touches the surface of the rear end portion of the first switch to perform the forward movement adjustment of the power seat (e.g., an operation of pushing the first switch forward), and when only one arrow guiding the forward movement adjustment of the power seat is displayed on the display, the user can accurately recognize the operating direction of the first switch for the forward movement adjustment of the power seat. However, as described above, the total six arrows are simultaneously displayed on the display to guide all operating directions of the power seat, which are operable through operation of the first switch so that there is a problem in that an operation direction of the first switch desired by the user is not accurately guided and thus discomfort is increased when the user operates the first switch.

The information included in this Background of the Invention section is only for enhancement of understanding of the general background of the invention and may not be taken as an acknowledgement or any form of suggestion that this information forms the related art already known to a person skilled in the art.

BRIEF SUMMARY

Various aspects of the present invention are directed to providing a device having a push button switch for operating a power seat of a vehicle, which is configured for improving switch operating convenience of a user, such as an accurate guidance of an operating direction of a power seat according to an operation of a switch to the user and allowance a select state and an operating direction of the switch to be accurately recognized by the user by embedding a plurality of touch sensors, which are configured to guide operating directions of a power seat, in switches of a switch module for an operation of the power seat, displaying one arrow guiding the operating direction of the power seat on a display according to a sensing operation of each of the touch sensors.

Objectives of the present invention are not limited to the above-described objectives, and other objectives of the present invention, which are not mentioned, may be understood by the following description and also will be apparently understood through embodiments of the present invention. Furthermore, the objectives of the present invention may be implemented by means described in the appended claims and a combination thereof.

In various exemplary embodiments of the present invention, various aspects of the present invention provide a device having a push button switch for operating a power seat of a vehicle, which may include: a switch module in which a plurality of push button type switches for inputting an operation to drive a power seat to a target position and in a target direction are modularized; a plurality of touch sensors embedded in the plurality of push button type switches and configured to guide operating directions of the power seat; a main controller configured to determine an operating direction of the power seat according to a sensing signal from a touch sensor in which a touch sensing operation is performed among the plurality of touch sensors; and a display configured to display the operating direction of the power seat determined by the main controller as one arrow and visually guide a user.

The switch module may include a first switch of a push button type configured to activate a forward movement operation and a backward movement operation of the power seat, an up operation and a down operation of a front portion of a seat cushion, and a vertical height adjustment operation of the power seat; a second switch of a push button type to activate a reclining operation of a seatback; a third switch of a push button type configured to activate an extension operation of the front portion of the seat cushion; a fourth switch of a push button type configured to activate a support direction adjustment operation of a lumbar support; and a fifth switch of a rotation knob type configured to activate a bolster angle adjustment operation of the seatback, wherein the push button type first to fourth switches and the rotation knob type fifth switch may be disposed in a predetermined arrangement.

The first switch of the push button type may include a first switch cover in which a first push button and a second push button which are configured to activate the forward and backward movement operations of the power seat, a third push button and a fourth push button which are configured to activate the up and down operations of the front portion of the seat cushion, and a fifth push button and a sixth push button which are configured to activate the vertical height adjustment operation of the power seat are formed in a predetermined arrangement; a plurality of touch sensors provided in areas of the first push button, the second push button, the third push button, the fourth push button and the six push buttons; and a first elevation block having an upper portion coupled to the first switch cover and a lower portion mounted on the main controller to be pressable.

The plurality of touch sensors included in the first switch of the push button type may include a first-first touch sensor embedded in an area of the first push button of the first switch cover for the forward movement operation of the power seat and connected to the main controller to enable signal output; a first-second touch sensor embedded in an area of the second push button of the first switch cover for the backward movement operation of the power seat and connected to the main controller to enable signal output; a first-third touch sensor embedded in an area of the third push button of the first switch cover for the up operation of the front portion of the seat cushion and connected to the main controller to enable signal output; a first-fourth touch sensor embedded in an area of the fourth push button of the first switch cover for the down operation of the front portion of the seat cushion and connected to the main controller to enable signal output; a first-fifth touch sensor embedded in an area of the fifth push button of the first switch cover for a seat ascending operation of the power seat and connected to the main controller to enable signal output; and a first-sixth touch sensor embedded in an area of the sixth push button of the first switch cover for a seat descending operation of the power seat and connected to the main controller to enable signal output.

The plurality of touch sensors included in the first switch of the push button type may be connected to the main controller to enable signal transmission through a flexible cable.

A tact switch pressed by a bottom portion of the first elevation block when the first elevation block descends may be mounted on the main controller.

The push button type second switch may include a second switch cover in which a seventh push button configured to activate a forward reclining operation of the seatback and an eighth push button configured to activate a backward reclining operation of the seatback are formed; a second-first touch sensor embedded in an area of the seventh push button of the second switch cover for the forward reclining operation of the seatback and connected to the main controller to enable signal output; a second-second touch sensor embedded in an area of the eighth push button of the second switch cover for the backward reclining operation of the seatback and connected to the main controller to enable signal output; and a second elevation block having an upper portion coupled to the second switch cover and a lower portion mounted on the main controller to be pressable.

The second-first touch sensor and the second-second touch sensor may be connected to the main controller to enable signal transmission through a conductive spring.

The push button type third switch may include a third switch cover in which a ninth push button configured to activate a forward extension operation of the front portion of the seat cushion and a tenth push button configured to activate a backward extension operation of the front portion of the seat cushion are formed; a third-first touch sensor embedded in an area of the ninth push button of the third switch cover for the forward extension operation of the front portion of the seat cushion and connected to the main controller to enable signal output; a third-second touch sensor embedded in an area of the tenth push button of the third switch cover for the backward extension operation of the front portion of the seat cushion and connected to the main controller to enable signal transmission; and a third elevation block having an upper portion coupled to the third switch cover and a lower portion mounted on the main controller to be pressable.

The third-first touch sensor and the third-second touch sensor may be connected to the main controller to enable signal transmission through a conductive spring.

The push button type fourth switch may include a fourth switch cover divided into a lumbar support forward protruding operation region, a lumbar support backward contraction operation region, a lumbar support ascending operation region, and a lumbar support descending operation region; a fourth-first touch sensor embedded in the lumbar support forward protruding operation region of the fourth switch cover and connected to the main controller to enable signal transmission; a fourth-second touch sensor embedded in the lumbar support backward contraction operation region of the fourth switch cover and connected to the main controller to enable signal transmission; a fourth-third touch sensor embedded in the lumbar support ascending operation region of the fourth switch cover and connected to the main controller to enable signal transmission; and a fourth-fourth touch sensor embedded in the lumbar support descending operation region of the fourth switch cover and connected to the main controller to enable signal transmission.

An integrated signal output path of the fourth-first touch sensor, the fourth-second touch sensor, the fourth-third touch sensor, and the fourth-fourth touch sensor may be connected to the main controller to enable signal transmission through a flexible cable.

The rotation knob type fifth switch may include a fifth switch cover mounted at a predetermined position on a circumference of the fourth switch cover; a fifth-first touch sensor embedded in a garnish plate adjacent to a side of the fifth switch cover and connected to the main controller to enable signal output; and a fifth-second touch sensor embedded in a garnish plate adjacent to another side of the fifth switch cover and connected to the main controller to enable signal output.

The fifth-first touch sensor and the fifth-second touch sensor may be connected to the main controller to enable signal transmission through a conductive spring.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and may include: hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
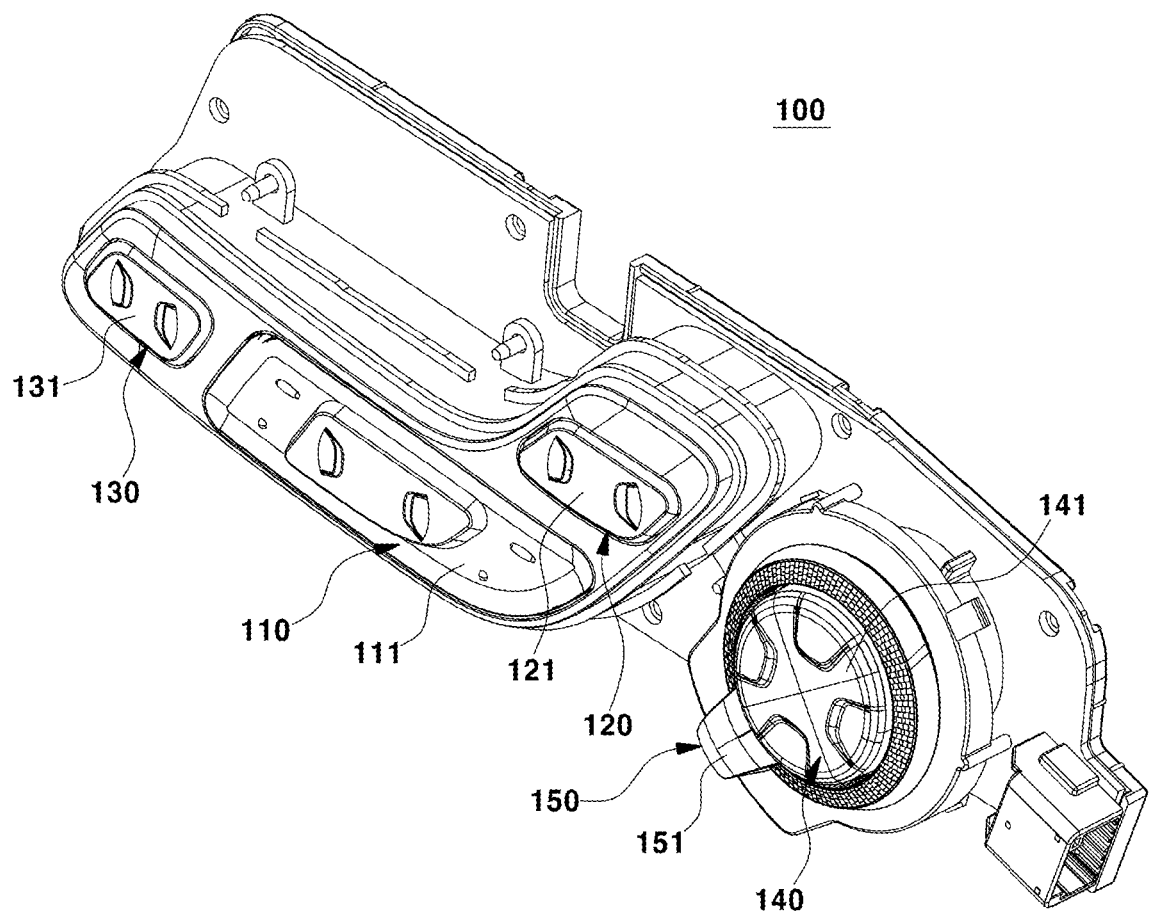
FIG. 1 is a perspective view exemplarily illustrating a switch module of a device configured for operating a power seat of a vehicle according to various exemplary embodiments of the present invention.

It may be understood that the appended drawings are not necessarily to scale, presenting a somewhat simplified representation of various exemplary features illustrative of the basic principles of the present invention. The specific design features of the present invention as included herein, including, for example, specific dimensions, orientations, locations, and shapes will be determined in part by the particular intended application and use environment.

In the figures, reference numbers refer to a same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On another hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings.

FIG. 1 illustrates a switch module of a device configured for operating a power seat of a vehicle according to various exemplary embodiments of the present invention.

A switch module 100 including push button type first to fourth switches 110, 120, 130, and 140 and one rotary knob type fifth switch 150, which are configured to operate a power seat, is provided in a side portion of the power seat (for example, a side portion of a seat cushion).

As shown in FIG. 1, the switch module 100 may include a first switch of a push button type 110 for a six-way adjustment including a forward and backward movement adjustment (two-way) of an entirety of the power seat, a front portion up and down adjustment (two-way) of the seat cushion, and a vertical height adjustment of the seat cushion (two-way); a second switch of a push button type 120 for an extension adjustment (two-way) with respect to a front portion of a seat cushion; a third switch of a push button type 130 for a reclining adjustment (two-way) of the seatback; a fourth switch of a push button type 140 for a support direction adjustment (four-way); and a fifth switch of a rotation knob type 150 for a an bolster angle adjustment (two-way) of the seatback of a lumbar support.

The push button type button refers to a button in which a switch is vertically pressed and operated, whereas the rotation knob type button refers to a button in which a switch is rotated at a predetermined angle and operated.

A plurality of touch sensors for guiding operating directions of the power seat are embedded in each of the first to fifth switches 110 to 150 forming the switch module 100.

When a main controller receives a sensed signal of a touch sensor among the plurality of touch sensors in which a sensing operation is performed, the main controller is configured to determine an operating direction of the power seat and an operating direction of the switch according to the sensed signal of a corresponding touch sensor and then transmits a control signal for displaying the operation direction on a display.

Thus, the seat image may be displayed on the display and one or more arrow images for guiding operating directions of the power seat and operating directions of the switch, which are determined by the main controller, may be displayed on the display.

Thus, a user may accurately recognize a switch selection state, the operating direction of the switch, and the operating direction of the power seat according to the operation of the switch while looking at the power seat and an arrow image which are displayed on the display so that switch operating convenience of the user may be improved.

Figure 2:
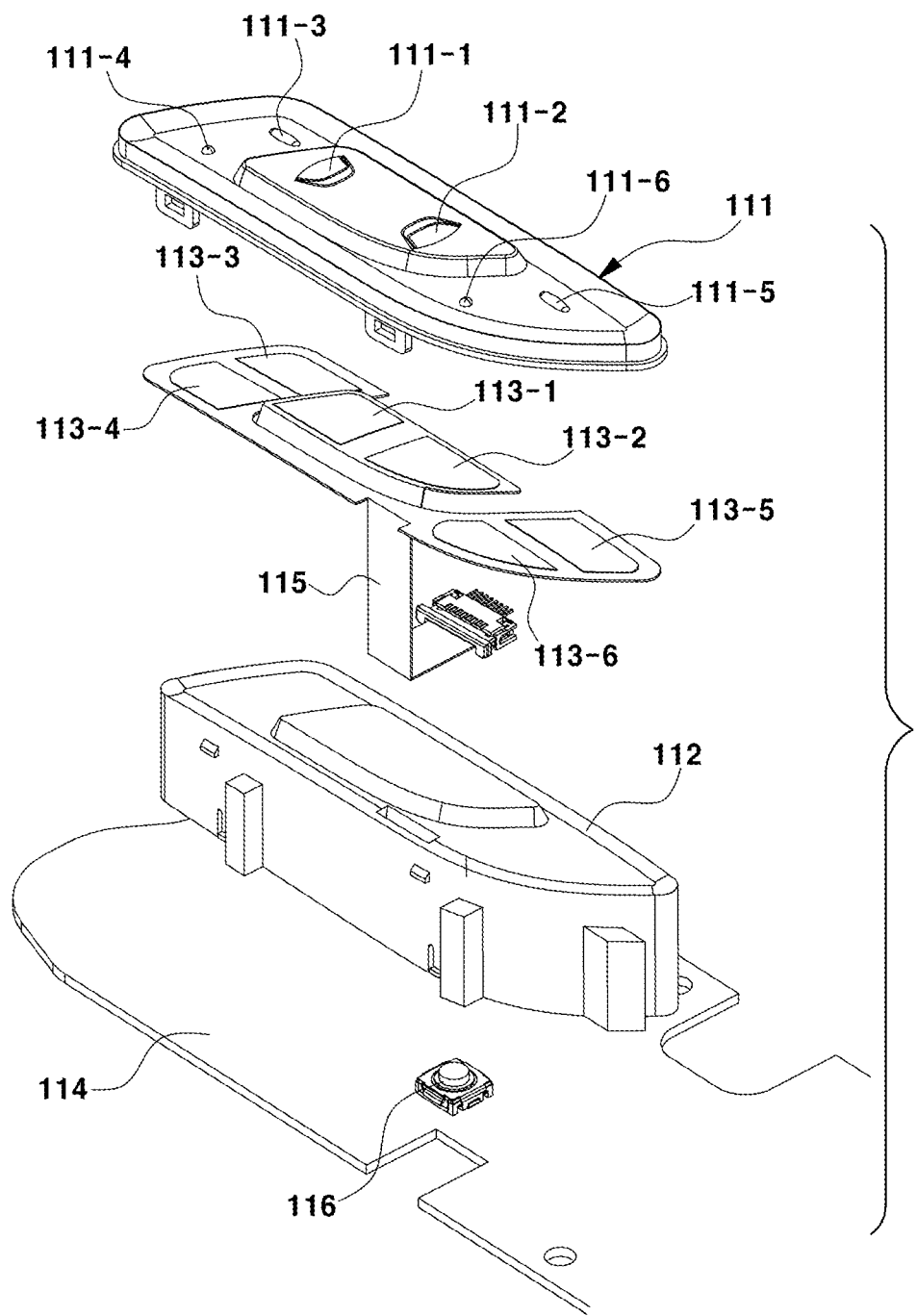
FIG. 2 is an exploded perspective view exemplarily illustrating a first switch of the switch module according to various exemplary embodiments of the present invention.
Figure 3:
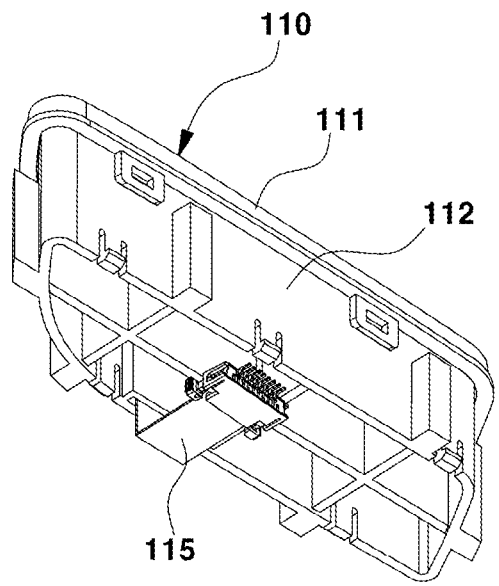
FIG. 3 and FIG. 4 are assembled perspective views exemplarily illustrating the first switch of the switch module according to various exemplary embodiments of the present invention.
Figure 4:
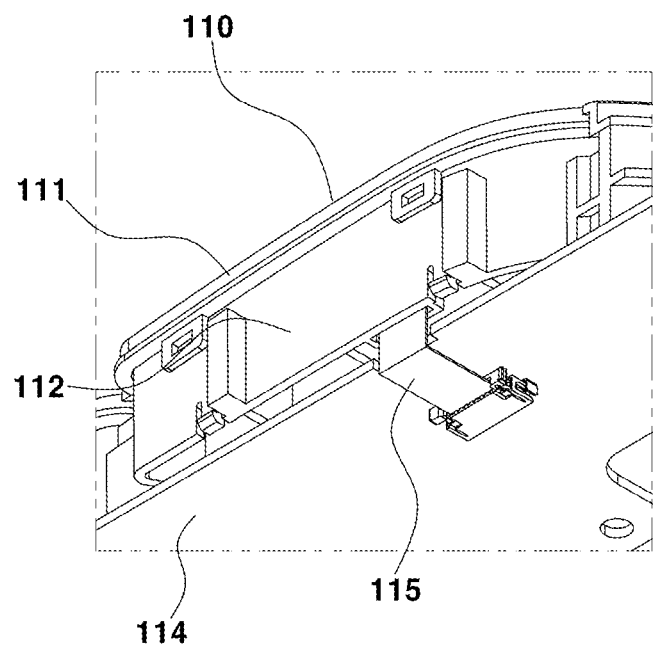

FIG. 2, FIG. 3 and FIG. 4 are diagrams illustrating the first switch of the switch module and an assembled state thereof according to various exemplary embodiments of the present invention, and a reference numeral 110 denotes the first switch.

The first switch of the push button type 110 is provided for operating a forward and backward movement (two-way) of the power seat, an up operation and a down operation (two-way) of a front portion of the seat cushion, and a vertical height adjustment operation (two-way) of the power seat and may include: a first switch cover 111 forming an exterior of the first switch 110.

To the present end, a first push button 111-1 and a second push button 111-2 for the forward and backward movement of the power seat, a third push button 111-3 and a fourth push button 111-4 for the up and down operations of the front portion of the seat cushion, and a fifth push button 111-5 and a sixth push button 111-6 for the vertical height adjustment operation of the power seat are formed in a predetermined arrangement at the first switch cover 111.

A plurality of touch sensors is embedded across and areas of the first push button to sixth push button of the first switch cover 111, and the plurality of touch sensors is connected to enable signal transmission through a main controller 114 and a flexible cable 115.

That is, the plurality of touch sensors is connected to the main controller 114 and the flexible cable 115 to enable signal transmission and disposed on a bottom portion of the first switch cover 111 to become in a state of being disposed to be touchable in the first to sixth push button areas.

The plurality of touch sensors include a first-first touch sensor 113-1, a first-second touch sensor 113-2, a first-third touch sensor 113-3, a first-fourth touch sensor 113-4, a first-fifth touch sensor 113-5, and a first-sixth touch sensor 113-6 and are disposed to be touchable in the areas of the first push button 111-1 to the sixth push button 111-6 of the first switch cover 111.

The first-first touch sensor 113-1 is embedded in the area of the first push button 111-1 of the first switch cover 111 for the forward movement operation of the power seat and is connected to the main controller 114 to enable signal output.

Thus, when the user touches the area of the first push button 111-1 of the first switch cover 111, sensing of the first-first touch sensor 113-1 in the first push button 111-1 is performed, and a sensing signal of the first-first touch sensor 113-1 is output to the main controller 114.

As such, when the main controller 114 receives the sensing signal of the first-first touch sensor 113-1, the main controller 114 determines an operating direction of the power seat and an operating direction of the first switch according to the sensing signal of the first-first touch sensor 113-1 as a forward movement direction of the power seat.

Figure 5A:
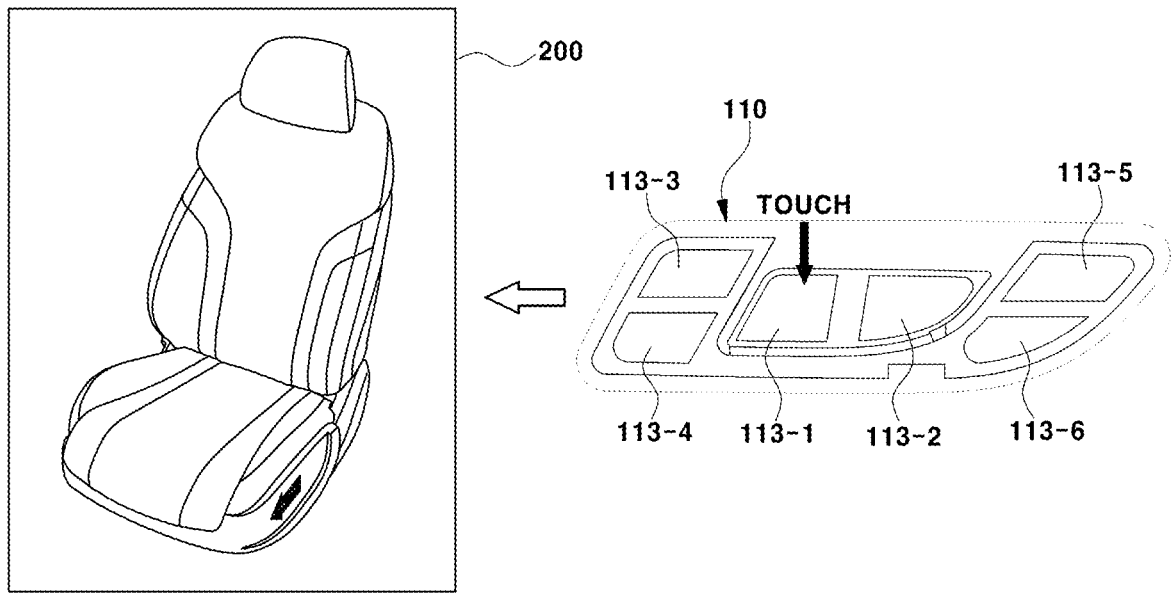
FIG. 5A, FIG. 5B, FIG. 5C, FIG. 5D, FIG. 5E and FIG. 5F are diagrams illustrating that images for guiding operating directions of a power seat are differently displayed on a display according to sensing of six touch sensors embedded in the first switch according to various exemplary embodiments of the present invention.

Subsequently, the main controller 114 transmits a display command signal to the display 200 according to the signal determined as the forward movement direction of the power seat so that, as shown in FIG. 5A, a seat image and one arrow image for guiding the forward movement direction of the power seat may be displayed on the display 200.

Therefore, when the user takes a look at the display 200, the user may easily recognize that the forward movement operation of the power seat may be performed by pressing the first push button 111-1 in a state of currently touching the area of the first push button 111-1 of the first switch cover 111.

Meanwhile, the first switch 110 may include: a first elevation block 112 of which an upper portion is coupled to the first switch cover 111 and a lower portion is mounted on the main controller 114 to be pushable.

Furthermore, the main controller 114 is provided with a tact switch 116 which is pressed by the bottom portion of the first elevation block 112 when the first elevation block 112 descends.

Thus, when the user presses one among the first to sixth push buttons 111-1 to 111-6 of the first switch cover 111, the first elevation block 112 descends, and when the tact switch 116 is pressed while the first elevation block 112 descends, the main controller 114 applies a driving signal to a corresponding motor to perform an operation of the power seat according to one among the first to sixth push buttons 111-1 to 111-6.

When the pressing of the first push button 111-1 is released, the first elevation block 112 and the first switch cover 111 having the first to sixth push buttons 111-1 to 111-6 ascend to their original positions due to an elastic reaction force of the tact switch 116.

The first-second touch sensor 113-2 is embedded in the area of the second push button 111-2 of the first switch cover 111 for the backward movement operation of the power seat and is connected to the main controller 114 to enable signal transmission.

Thus, when the user touches the area of the second push button 111-2 of the first switch cover 111, sensing of the first-second touch sensor 113-2 in the second push button 111-2 is performed, and a sensing signal of the first-second touch sensor 113-2 is output to the main controller 114.

As such, when the main controller 114 receives the sensing signal of the first-second touch sensor 113-2, the main controller 114 determines an operating direction of the power seat and an operating direction of the switch according to the sensing signal of the first-second touch sensor 113-2 as a backward movement direction of the power seat.

Figure 5B:
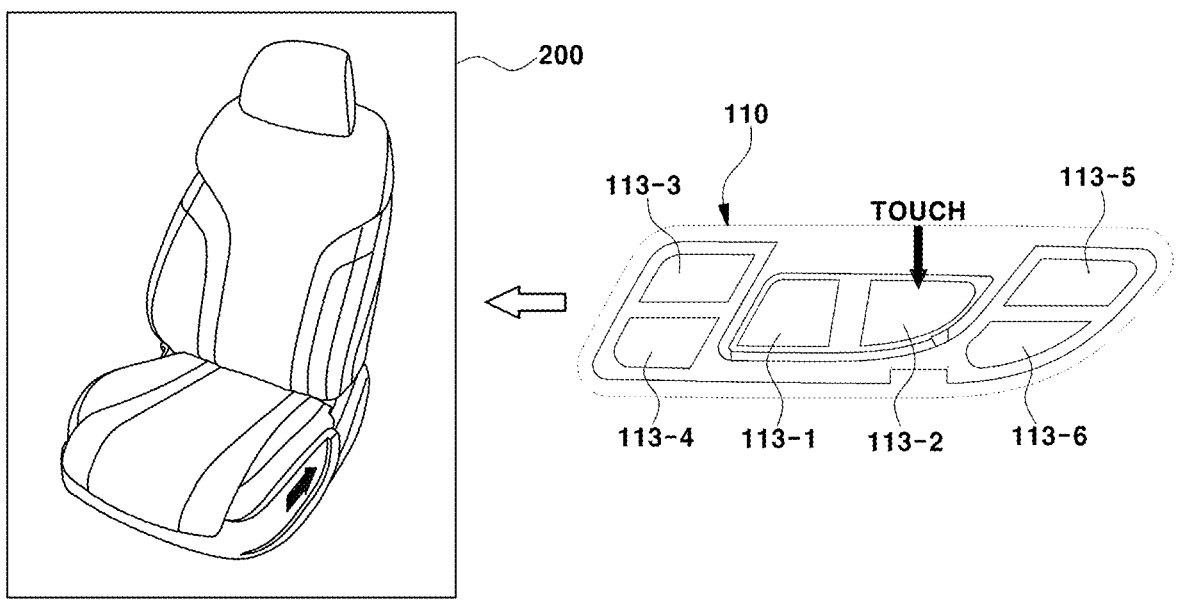

Subsequently, the main controller 114 transmits a display command signal to the display 200 according to the signal determined as the backward movement direction of the power seat so that, as shown in FIG. 5B, a seat image and one arrow image for guiding the backward movement direction of the power seat may be displayed on the display 200.

Therefore, when the user takes a look at the display 200, the user may easily recognize that the backward movement operation of the power seat may be performed by pressing the second push button 111-2 in a state of currently touching the area of the second push button 111-2 of the first switch cover 111.

The first-third touch sensor 113-3 is embedded in the area of the third push button 111-3 of the first switch cover 111 for an up operation of the front portion of the seat cushion and is connected to the main controller 114 to enable signal transmission.

Thus, when the user touches the area of the third push button 111-3 of the first switch cover 111, sensing of the first-third touch sensor 113-3 in the third push button 111-3 is performed, and a sensing signal of the first-third touch sensor 113-3 is output to the main controller 114.

As such, when the main controller 114 receives the sensing signal of the first-third touch sensor 113-3, the main controller 114 determines an operating direction of the power seat and an operating direction of the switch according to the sensing signal of the first-third touch sensor 113-3 as the up operation of the front portion of the seat cushion of the power seat.

Figure 5C:
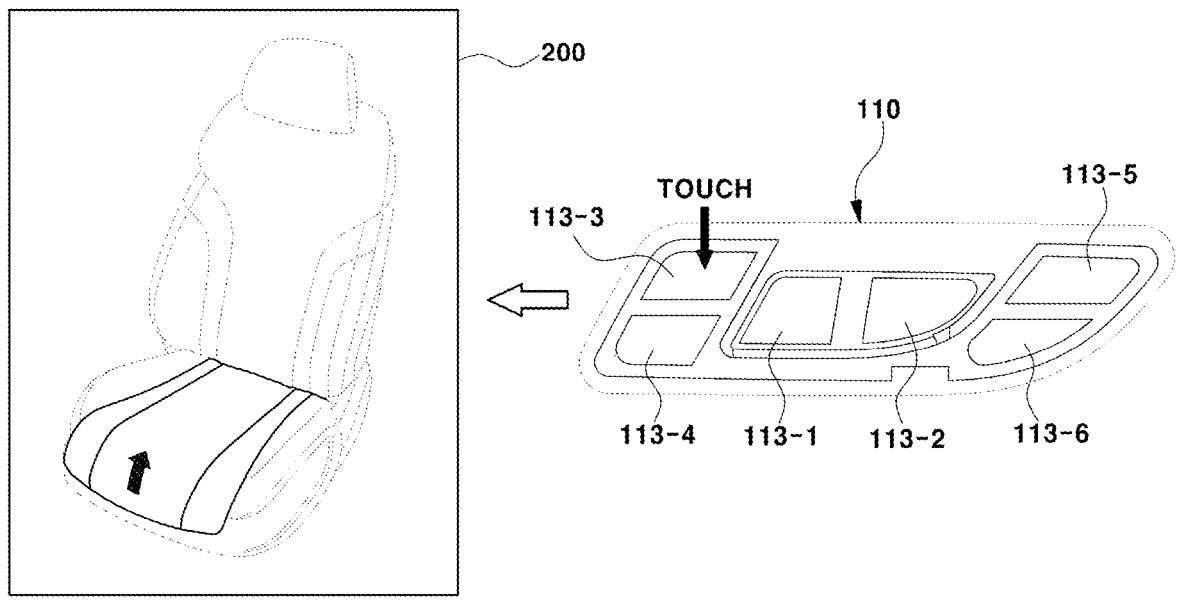

Subsequently, the main controller 114 transmits a display command signal to the display 200 according to the signal determined as the up direction of the front portion of the seat cushion so that, as shown in FIG. 5C, a seat image and one arrow image for guiding the up direction of the front portion of the seat cushion may be displayed on the display 200.

Therefore, when the user takes a look at the display 200, the user may easily recognize that the up operation of the front portion of the seat cushion may be performed by pressing the third push button 111-3 in a state of currently touching the area of the third push button 111-3 of the first switch cover 111.

The first-fourth touch sensor 113-4 is embedded in the area of the fourth push button 111-4 of the first switch cover 111 for a down operation of the front portion of the seat cushion and is connected to the main controller 114 to enable signal transmission.

Thus, when the user touches the area of the fourth push button 111-4 of the first switch cover 111, sensing of the first-fourth touch sensor 113-4 in the fourth push button 111-4 is performed, and a sensing signal of the first-fourth touch sensor 113-4 is output to the main controller 114.

As such, when the main controller 114 receives the sensing signal of the first-fourth touch sensor 113-4, the main controller 114 determines an operating direction of the power seat and an operating direction of the first switch according to the sensing signal of the first-fourth touch sensor 113-4 as the down operation of the front portion of the seat cushion of the power seat.

Figure 5D:
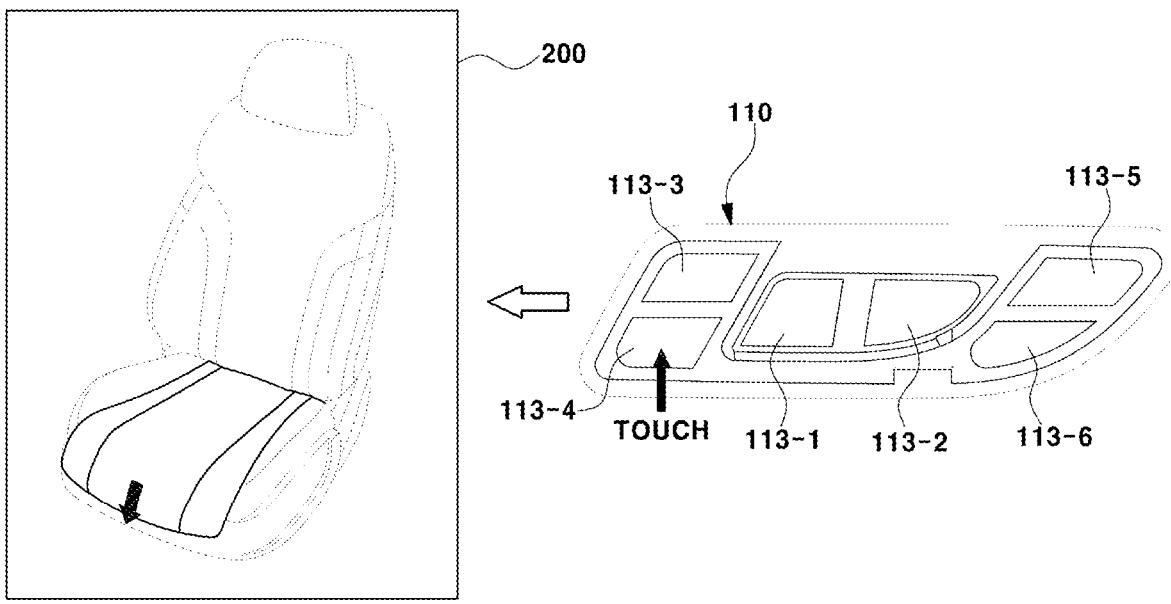

Subsequently, the main controller 114 transmits a display command signal to the display 200 according to the signal determined as the down operation of the front portion of the seat cushion so that, as shown in FIG. 5D, a seat image and one arrow image for guiding the down direction of the front portion of the seat cushion may be displayed on the display 200.

Therefore, when the user takes a look at the display 200, the user may easily recognize that the down operation of the front portion of the seat cushion may be performed by pressing the fourth push button 111-4 in a state of currently touching the area of the fourth push button 111-4 of the first switch cover 111.

The first-fifth touch sensor 113-5 is embedded in the area of the fifth push button 111-5 of the first switch cover 111 for the seat ascending operation of the power seat and is connected to the main controller 114 to enable signal transmission.

Thus, when the user touches the area of the fifth push button 111-5 of the first switch cover 111, sensing of the first-fifth touch sensor 113-5 in the fifth push button 111-5 is performed, and a sensing signal of the first-fifth touch sensor 113-5 is output to the main controller 114.

As such, when the main controller 114 receives the sensing signal of the first-fifth touch sensor 113-5, the main controller 114 determines an operating direction of the power seat and an operating direction of the first switch according to the sensing signal of the first-fifth touch sensor 113-5 as an ascending movement direction of the power seat.

Figure 5E:
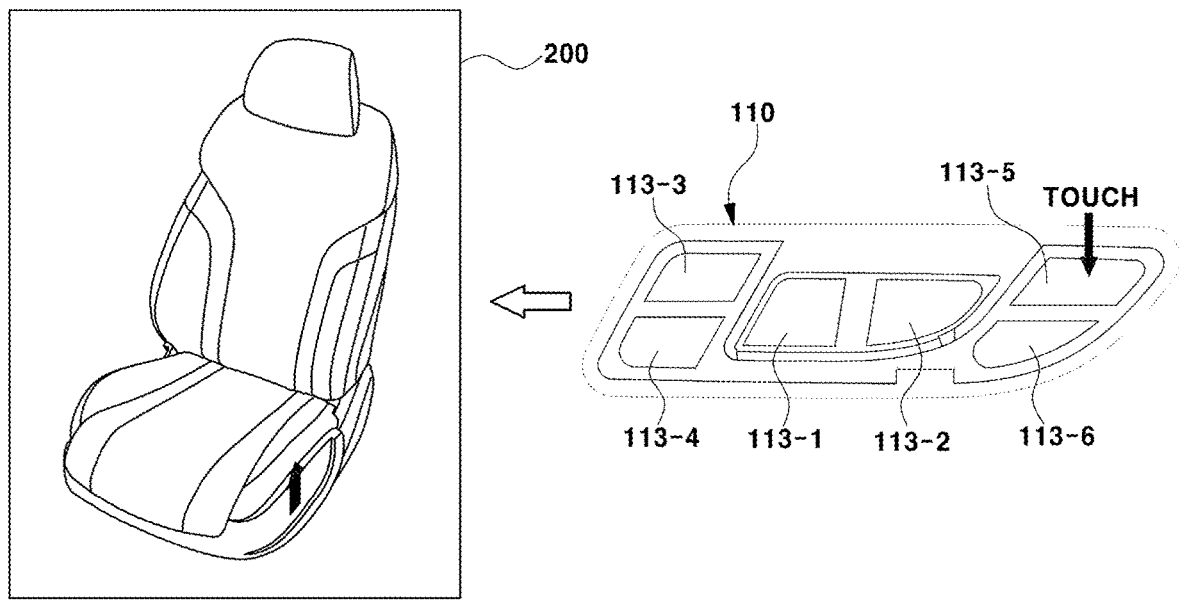

Subsequently, the main controller 114 transmits a display command signal to the display 200 according to the signal determined as the ascending movement direction of the power seat so that, as shown in FIG. 5E, a seat image and one arrow image for guiding the ascending movement direction of the power seat may be displayed on the display 200.

Therefore, when the user takes a look at the display 200, the user may easily recognize that the ascending movement operation of the power seat may be performed by pressing the fifth push button 111-5 in a state of currently touching the area of the fifth push button 111-5 of the first switch cover 111.

The first-sixth touch sensor 113-6 is embedded in the area of the sixth push button 111-6 of the first switch cover 111 for the seat descending operation of the power seat and is connected to the main controller 114 to enable signal transmission.

Thus, when the user touches the area of the sixth push button 111-6 of the first switch cover 111, sensing of the first-sixth touch sensor 113-6 in the sixth push button 111-6 is performed, and a sensing signal of the first-sixth touch sensor 113-6 is output to the main controller 114.

As such, when the main controller 114 receives the sensing signal of the first-sixth touch sensor 113-6, the main controller 114 determines an operating direction of the power seat and an operating direction of the first switch according to the sensing signal of the first-sixth touch sensor 113-6 as a descending movement direction of the power seat.

Figure 5F:
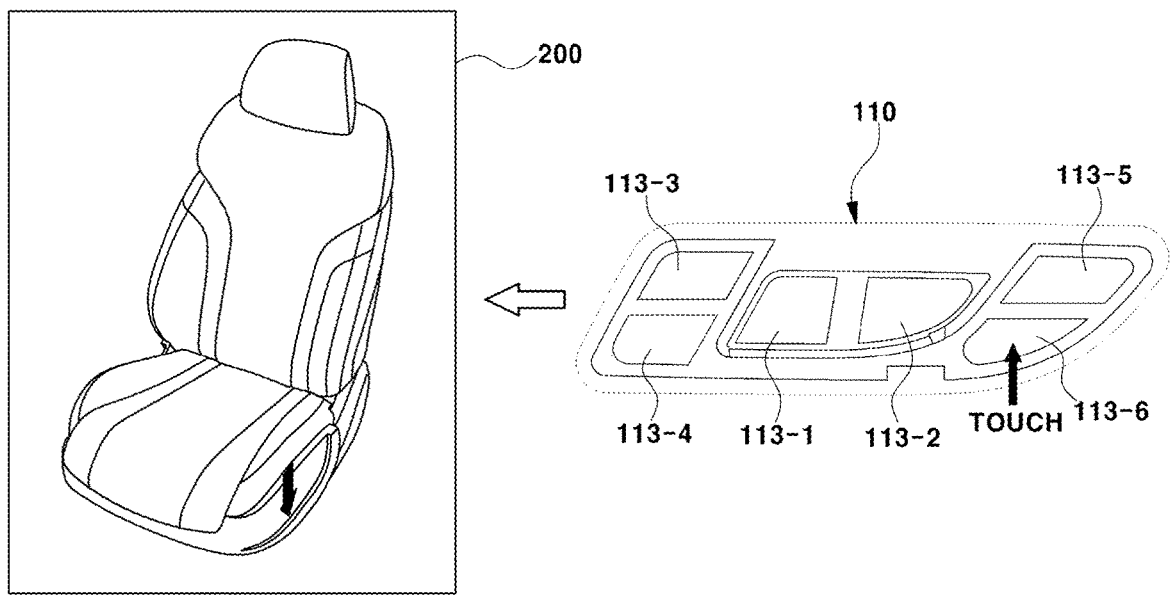

Subsequently, the main controller 114 transmits a display command signal to the display 200 according to the signal determined as the descending movement direction of the power seat so that, as shown in FIG. 5F, a seat image and one arrow image for guiding the descending movement direction of the power seat may be displayed on the display 200.

Therefore, when the user takes a look at the display 200, the user may easily recognize that a height of the power seat may be adjusted to descend by pressing the sixth push button 111-6 in a state of currently touching the area of the sixth push button 111-6 of the first switch cover 111.

Figure 6:
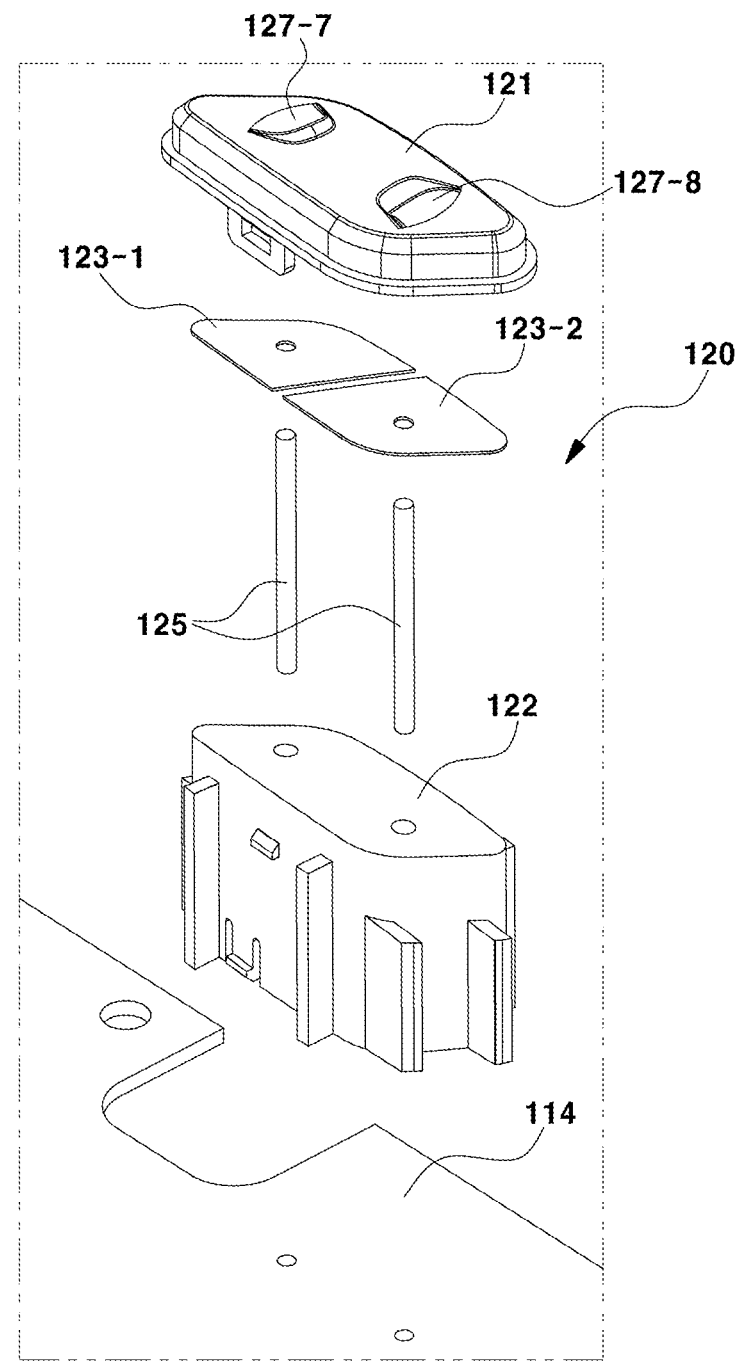
FIG. 6 is an exploded perspective view exemplarily illustrating a second switch of the switch module according to various exemplary embodiments of the present invention.
Figure 7:
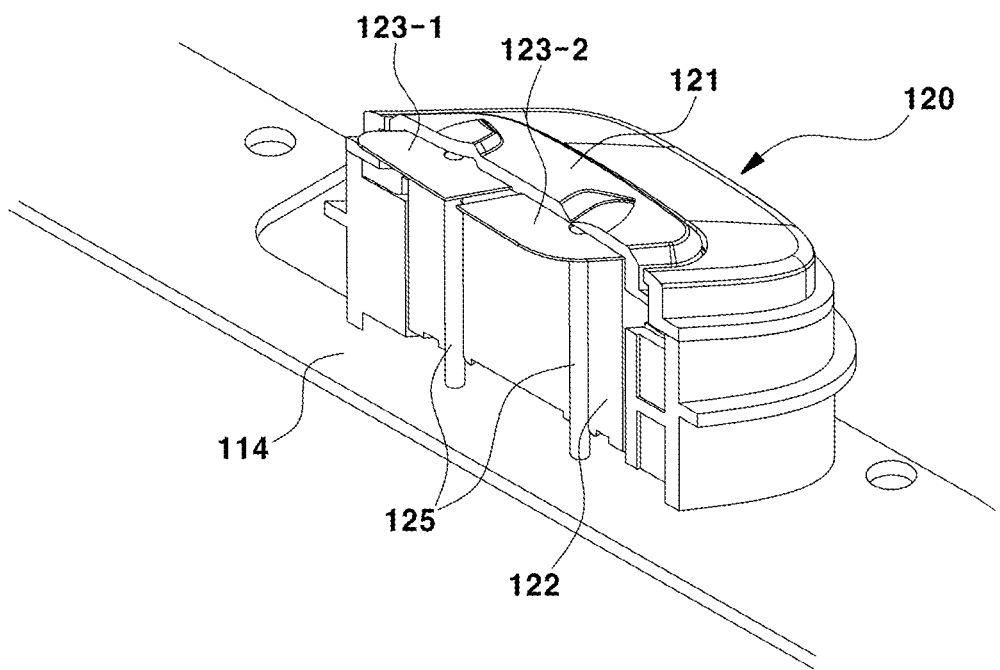
FIG. 7 is an assembled perspective view exemplarily illustrating the second switch of the switch module according to various exemplary embodiments of the present invention.

FIG. 6 and FIG. 7 are diagrams illustrating a second switch of the switch module and an assembled state thereof according to various exemplary embodiments of the present invention, and a reference numeral 120 denotes the second switch of a push button type.

The second switch 120 of the push button type is to activate a reclining operation of the seatback and may include: a second switch cover 121 forming an exterior of the second switch 120.

To the present end, a seventh push button 121-7 for a forward reclining operation of the seatback and an eighth push button 121-8 for a backward reclining operation of the seatback are formed at the second switch cover 121 in parallel.

A second-first touch sensor 123-1 and a second-second touch sensor 123-2 are embedded in areas of the seventh push button 121-7 and the eighth push button 121-8 of the second switch cover 121, respectively, and are connected to the main controller 114 through a conductive spring 125 to enable signal transmission.

Meanwhile, the second switch 120 may include: a second elevation block 122 of which an upper portion is coupled to the second switch cover 121 and a lower portion is mounted on the main controller 114 to be pushable.

In the instant case, the main controller 114 may be provided with a tact switch (same as the tact switch indicated by 112 in FIG. 6) which is pressed by a bottom portion of the second elevation block 122 when the second elevation block 122 descends.

Thus, when the user presses the seventh push button 121-7 or the eighth push button 121-8 of the second switch cover 121 for the reclining operation of the seatback, the second elevation block 122 descends, and when the second elevation block 122 presses the tact switch while descending, the main controller 114 applies a driving signal to a motor configured for the reclining operation of the seatback.

The second-first touch sensor 123-1 is embedded in the area of the seventh push button 121-7 of the second switch cover 121 for the forward reclining operation of the seatback and is connected to the main controller 114 to enable signal transmission due to the conductive spring 125.

Thus, when the user touches the area of the seventh push button 121-7 of the second switch cover 121, sensing of the second-first touch sensor 123-1 in the seventh push button 121-7 is performed, and a sensing signal of the second-first touch sensor 123-1 is output to the main controller 114.

As such, when the main controller 114 receives the sensing signal of the second-first touch sensor 123-1, the main controller 114 determines an operating direction of the power seat and an operating direction of the first switch according to the sensing signal of the second-first touch sensor 123-1 as a forward reclining movement direction of the power seat.

Figure 8A:
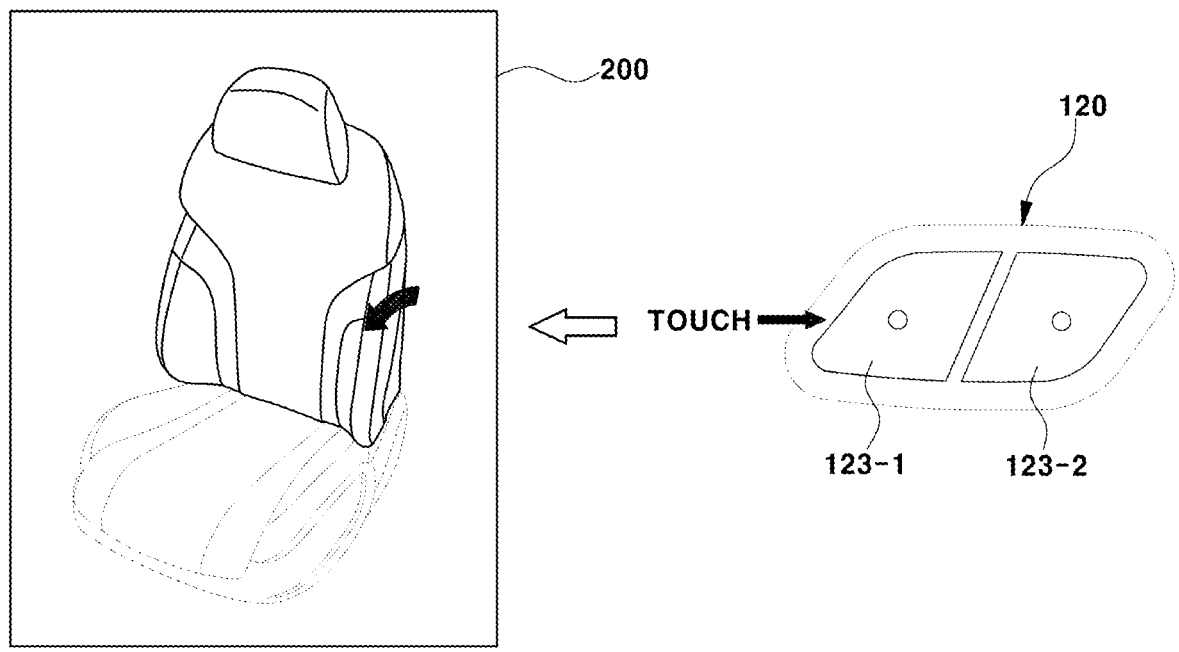
FIG. 8A and FIG. 8B are diagrams illustrating that images for guiding operating directions of the power seat are differently displayed on the display according to sensing of two touch sensors embedded in the second switch according to various exemplary embodiments of the present invention.

Subsequently, the main controller 114 transmits a display command signal to the display 200 according to the signal determined as the forward reclining movement direction of the power seat so that, as shown in FIG. 8A, a seat image and one arrow image for guiding the forward reclining operating direction of the power seat may be displayed on the display 200.

Therefore, when the user takes a look at the display 200, the user may easily recognize that the forward reclining operation of the power seat may be performed by pressing the seventh push button 121-7 in a state of currently touching the area of the seventh push button 121-7 of the second switch cover 121.

The second-second touch sensor 123-2 is embedded in the area of the eighth push button 121-8 of the second switch cover 121 for a backward reclining operation of the seatback and is connected to the main controller 114 to enable signal transmission due to the conductive spring 125.

Thus, when the user touches the area of the eighth push button 121-8 of the second switch cover 121, sensing of the second-second touch sensor 123-2 in the eighth push button 121-8 is performed, and a sensing signal of the second-second touch sensor 123-2 is output to the main controller 114.

As such, when the main controller 114 receives the sensing signal of the second-second touch sensor 123-2, the main controller 114 determines an operating direction of the power seat and an operating direction of the first switch according to the sensing signal of the second-second touch sensor 123-2 as a backward reclining direction of the power seat.

Figure 8B:
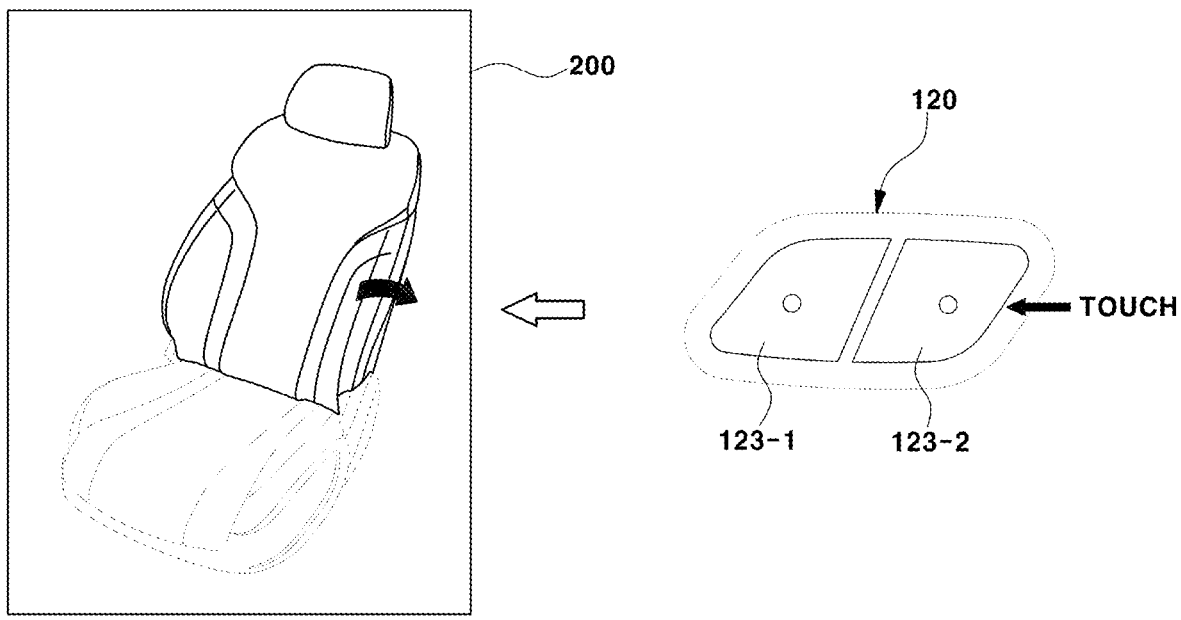

Subsequently, the main controller 114 transmits a display command signal to the display 200 according to the signal determined as the backward reclining movement direction of the power seat so that, as shown in FIG. 8B, a seat image and one arrow image for guiding the backward reclining direction of the seatback may be displayed on the display 200.

Therefore, when the user takes a look at the display 200, the user may easily recognize that the backward reclining operation of the seatback may be performed by pressing the eighth push button 121-8 in a state of currently touching the area of the eighth push button 121-8 of the second switch cover 121.

Figure 9:
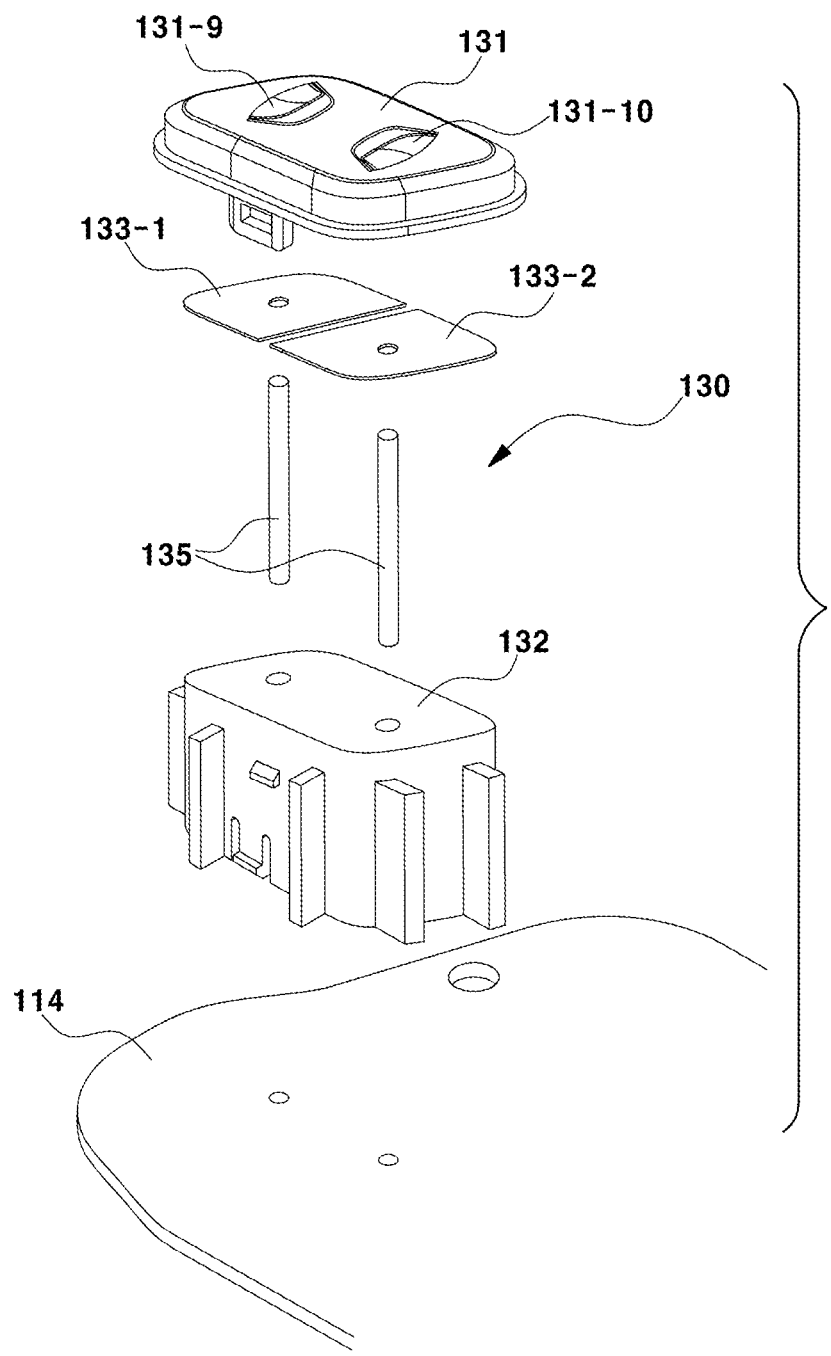
FIG. 9 is an exploded perspective view exemplarily illustrating a third switch of the switch module according to various exemplary embodiments of the present invention.
Figure 10:
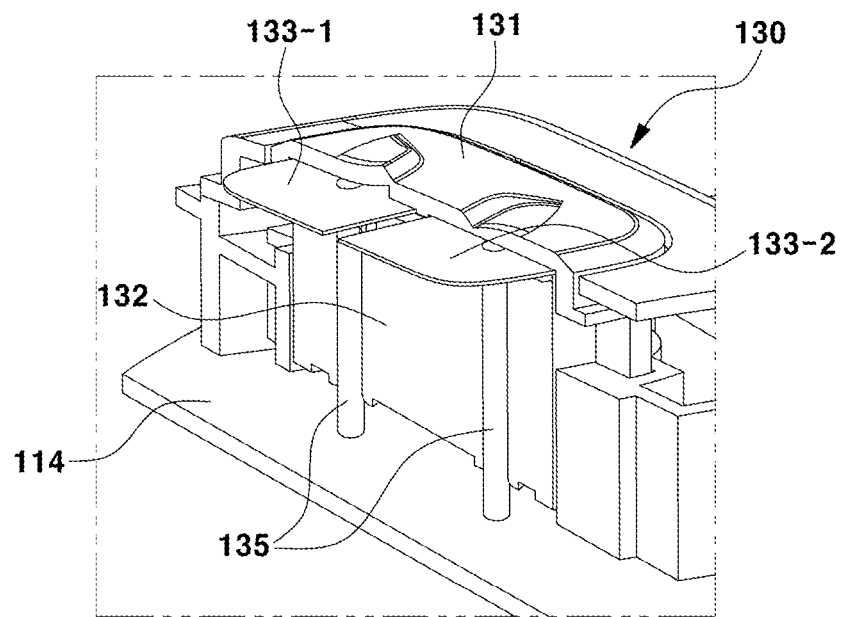
FIG. 10 is an assembled perspective view exemplarily illustrating the third switch of the switch module according to various exemplary embodiments of the present invention.

FIG. 9 and FIG. 10 are diagrams illustrating a third switch of the switch module and an assembled state thereof according to various exemplary embodiments of the present invention, and a reference numeral 130 denotes the third switch of a push button type.

The third switch 130 of the push button type is to activate an extension operation of the front portion of the seat cushion and may include: a third switch cover 131 forming an exterior of the third switch 130.

To the present end, a ninth push button 131-9 for a forward extension operation of the front portion of the seat cushion and a tenth push button 131-10 for a backward extension operation of the front portion of the seat cushion are formed at the third switch cover 131 in parallel.

A third-first touch sensor 133-1 and a third-second touch sensor 133-2 are embedded in areas of the ninth push button 131-9 and the tenth push button 131-10 of the third switch cover 131, respectively, and are connected to the main controller 114 through a conductive spring 135 to enable signal transmission.

Furthermore, the third switch 130 may include: a third elevation block 132 of which an upper portion is coupled to the third switch cover 131 and a lower portion is mounted on the main controller 114 to be pushable.

In the instant case, the main controller 114 may be provided with a tact switch (same as the tact switch indicated by 112 in FIG. 6) which is pressed by a bottom portion of the third elevation block 132 when the third elevation block 132 descends.

Thus, when the user presses the ninth push button 131-9 or the tenth push button 131-10 of the third switch cover 131 for the extension operation of the front portion of the seat cushion, the third elevation block 132 descends, and when the third elevation block 132 presses the tact switch while descending, the main controller 114 applies a driving signal to a motor configured for the extension operation of the front portion of the seat cushion.

The third-first touch sensor 133-1 is embedded in the area of the ninth push button 131-9 of the third switch cover 131 for the forward extension operation of the front portion of the seat cushion and is connected to the main controller 114 to enable signal transmission through the conductive spring 135.

Thus, when the user touches the area of the ninth push button 131-9 of the third switch cover 131, sensing of the third-first touch sensor 133-1 in the ninth push button 131-9 is performed, and a sensing signal of the third-first touch sensor 133-1 is output to the main controller 114.

Subsequently, the main controller 114 determines an operating direction of the power seat and an operating direction of the switch according to the sensing signal of the third-first touch sensor 133-1 as the forward extension direction of the front portion of the seat cushion.

Figure 11A:
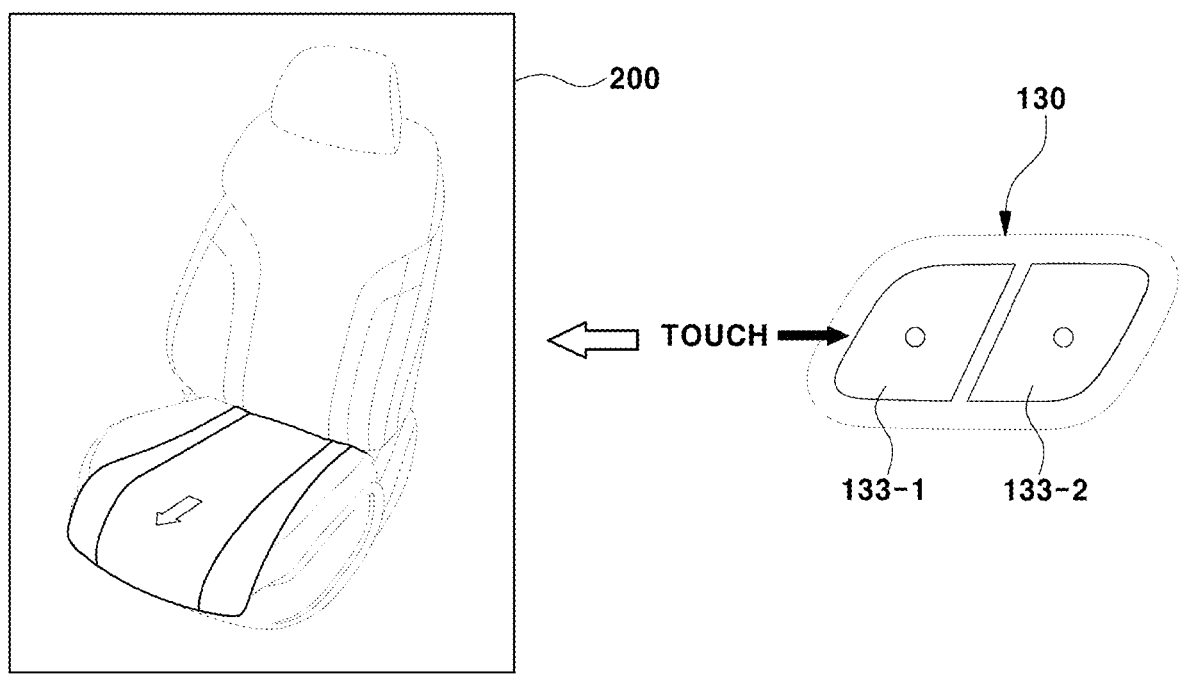
FIG. 11A and FIG. 11B are diagrams illustrating that images for guiding operating directions of the power seat are differently displayed on the display according to sensing of two touch sensors embedded in the third switch according to various exemplary embodiments of the present invention.

Subsequently, the main controller 114 transmits a display command signal to the display 200 according to the signal determined as the forward extension direction of the front portion of the seat cushion so that, as shown in FIG. 11A, a seat image and one arrow image for guiding the forward extension direction of the front portion of the seat cushion may be displayed on the display 200.

Therefore, when the user takes a look at the display 200, the user may easily recognize that the forward extension operation, in which a length of the front portion of the seat cushion is extended, may be performed by pressing the ninth push button 131-9 in a state of currently touching the area of the ninth push button 131-9 of the third switch cover 131.

The third-second touch sensor 133-2 is embedded in the area of the tenth push button 131-10 of the third switch cover 131 for the backward extension operation of the front portion of the seat cushion and is connected to the main controller 114 to enable signal transmission through the conductive spring 135.

Thus, when the user touches the area of the tenth push button 131-10 of the third switch cover 131, sensing of the third-second touch sensor 133-2 in the tenth push button 131-10 is performed, and a sensing signal of the third-second touch sensor 133-2 is output to the main controller 114 through the conductive spring 135.

Subsequently, the main controller 114 determines an operating direction of the power seat and an operating direction of the switch according to the sensing signal of the third-second touch sensor 133-2 as the backward extension direction of the front portion of the seat cushion.

Figure 11B:
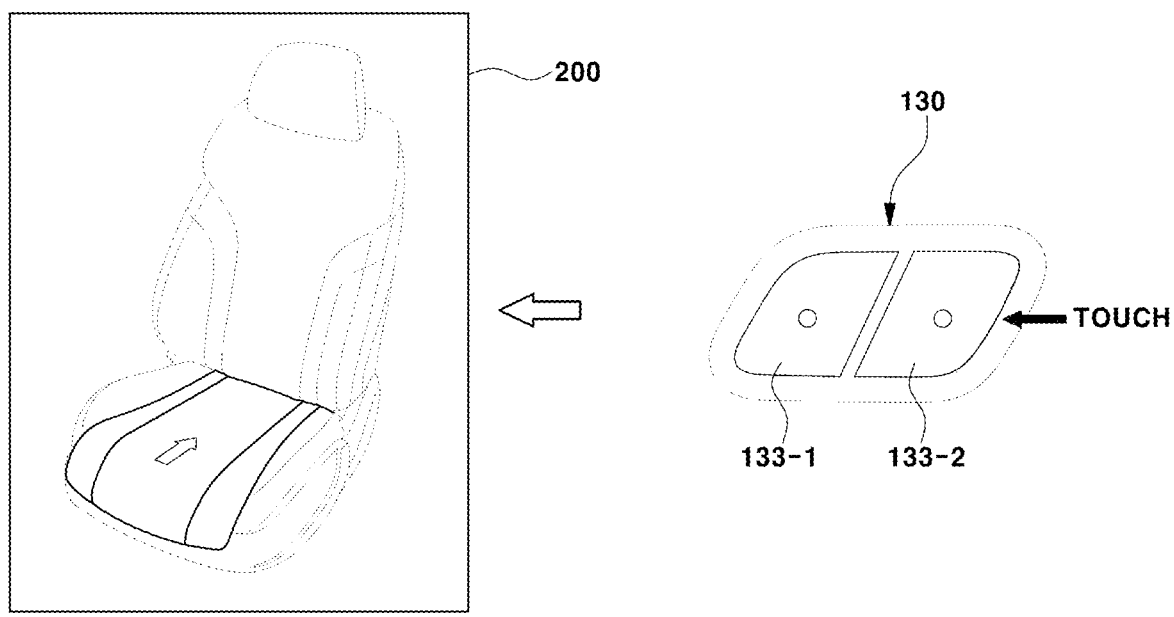

Subsequently, the main controller 114 transmits a display command signal to the display 200 according to the signal determined as the backward extension direction of the front portion of the seat cushion so that, as shown in FIG. 11B, a seat image and one arrow image for guiding the backward extension direction of the front portion of the seat cushion may be displayed on the display 200.

Therefore, when the user takes a look at the display 200, the user may easily recognize that the backward extension operation, in which the length of the front portion of the seat cushion is reduced, may be performed by pressing the tenth push button 131-10 in a state of currently touching the area of the tenth push button 131-10 of the third switch cover 131.

Figure 12:
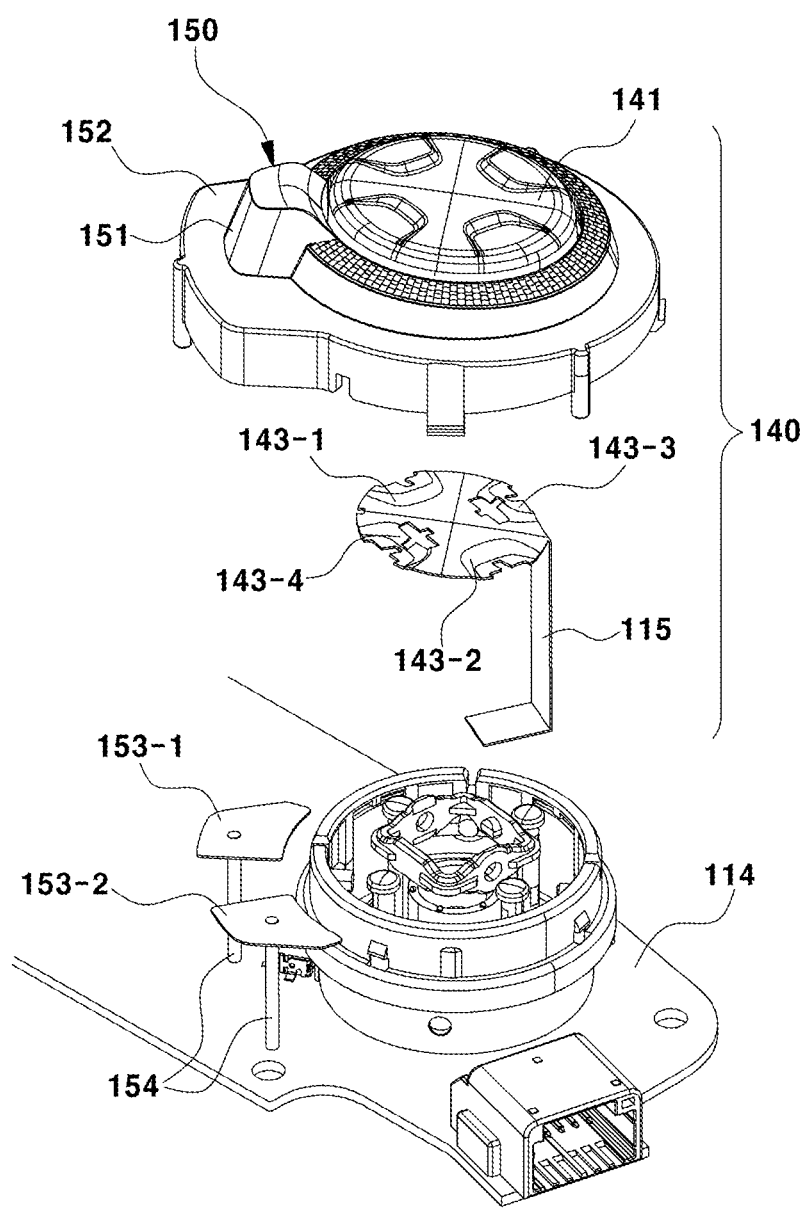
FIG. 12, and FIG. 13 are perspective views exemplarily illustrating a fourth switch of the switch module according to various exemplary embodiments of the present invention.
Figure 13:
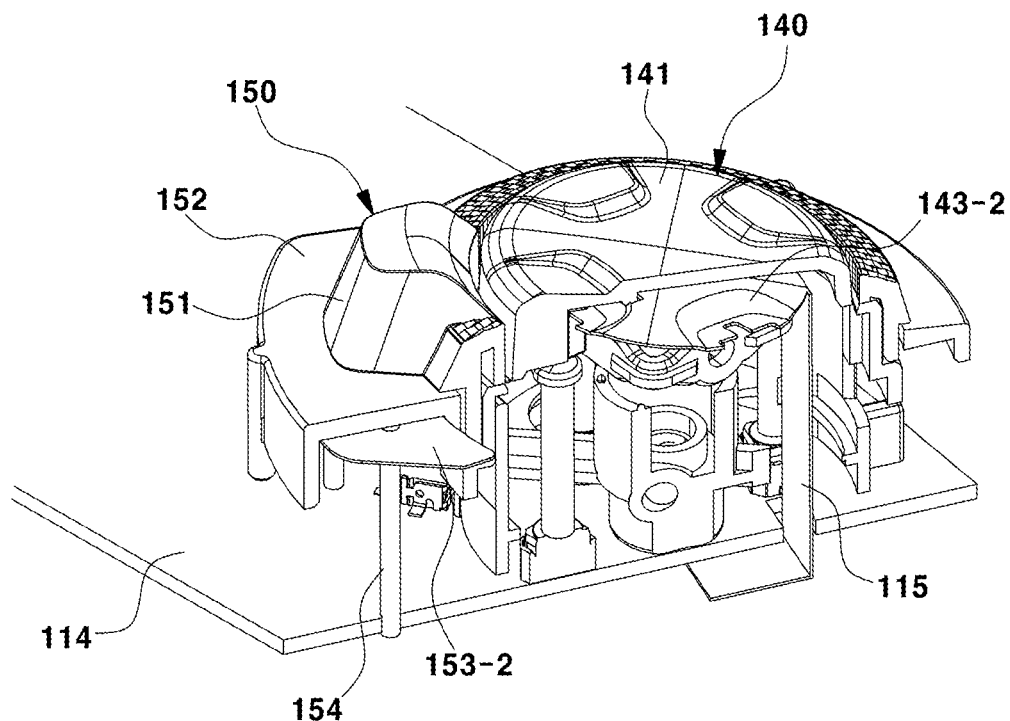

FIG. 12, and FIG. 13 are diagrams illustrating a fourth switch of the switch module and an assembled state thereof according to various exemplary embodiments of the present invention, and a reference numeral 140 denotes the fourth switch.

The fourth switch 140 of the push button type is to activate a support direction adjustment operation of a lumbar support provided in the seatback and may include: a fourth switch cover 141 forming an exterior of the fourth switch 140.

As shown in FIG. 12, and FIG. 13, the fourth switch cover 141 has a structure which may include: a lumbar support forward protruding operation region 141-1, a lumbar support backward contraction operation region 141-2, a lumbar support ascending operation region 141-3, and a lumbar support descending operation region 141-4.

A fourth-first touch sensor 143-1 connected to the main controller 114 to enable signal transmission is embedded in the lumbar support forward protruding operation region 141-1 of the fourth switch cover 141, and a fourth-second touch sensor 143-2 connected to the main controller 114 to enable signal transmission is embedded in the lumbar support backward contraction operation region 141-2 of the fourth switch cover 141.

Furthermore, a fourth-third touch sensor 143-3 connected to the main controller 114 to enable signal transmission is embedded in the lumbar support ascending operation region 141-3 of the fourth switch cover 141, and a fourth-fourth touch sensor 143-4 connected to the main controller 114 to enable signal transmission is embedded in the lumbar support descending operation region 141-4 of the fourth switch cover 141.

In the instant case, an integrated signal output path of the fourth-first touch sensor 143-1, fourth-second touch sensor 143-2, fourth-third touch sensor 143-3, and fourth-fourth touch sensor 143-4 is connected to the main controller 114 to enable signal transmission through the flexible cable 115.

Thus, when the user touches the area of the lumbar support forward protruding operation region 141-1 of the fourth switch cover 141, sensing of the fourth-first touch sensor 143-1 in the lumbar support forward protruding operation region 141-1 is performed, and a sensing signal of the fourth-first touch sensor 143-1 is output to the main controller 114 through the flexible cable 115.

As such, the main controller 114 determines an operating direction of the power seat and an operating direction of the switch according to the sensing signal of the fourth-first touch sensor 143-1 as a lumbar support forward protruding direction thereof.

Figure 14A:
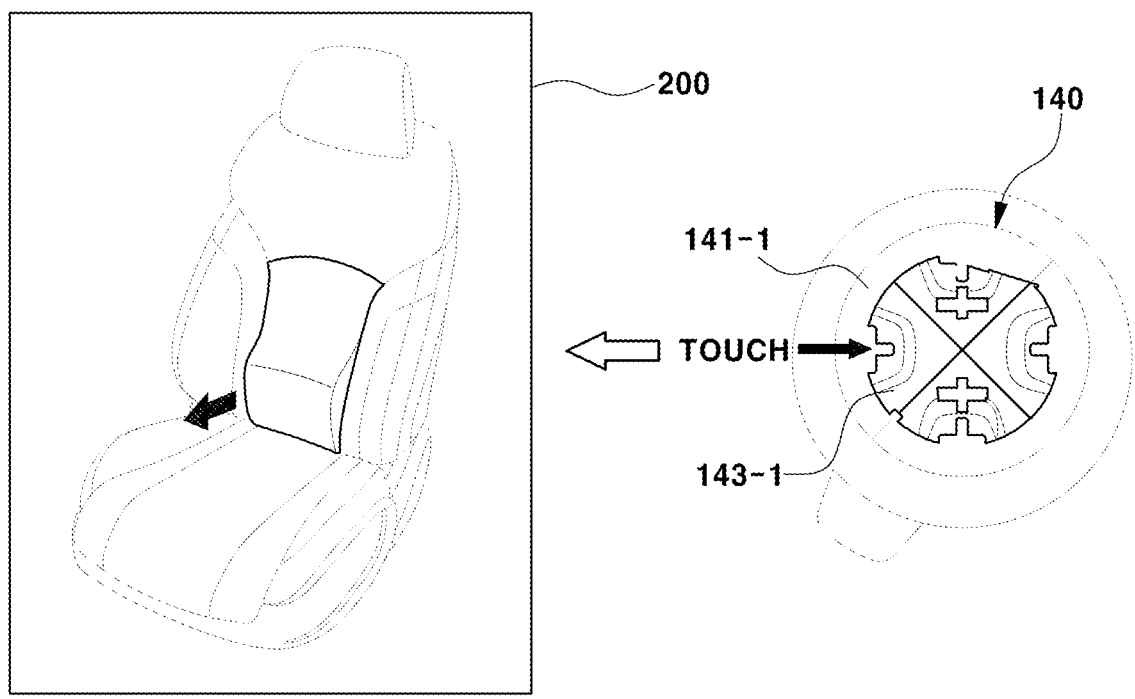
FIG. 14A, FIG. 14B, FIG. 14C and FIG. 14D are diagrams illustrating that images for guiding operating directions of the power seat are differently displayed on a display according to sensing of a touch sensor embedded in the fourth switch according to various exemplary embodiments of the present invention.

Subsequently, the main controller 114 transmits a display command control signal to the display 200 according to the signal determined as the lumbar support forward protruding direction so that, as shown in FIG. 14A, a seat image and one arrow image for guiding the lumbar support forward protruding operating direction may be displayed on the display 200.

Therefore, when the user takes a look at the display 200, the user may easily recognize that a lumbar support is operated to protrude forward when pressing the fourth switch cover 141 in a state of currently touching the lumbar support forward protruding operation region 141-1 of the fourth switch cover 141.

Alternatively, when the user touches the area of the lumbar support backward contraction operation region 141-2 of the fourth switch cover 141, sensing of the fourth-second touch sensor 143-2 in the lumbar support backward contraction operation region 141-2 is performed, and a sensing signal of the fourth-second touch sensor 143-2 is output to the main controller 114 through the flexible cable 115.

As such, the main controller 114 determines an operating direction of the power seat and an operating direction of the switch according to the sensing signal of the fourth-second touch sensor 143-2 as a lumbar support backward contraction direction thereof.

Figure 14B:
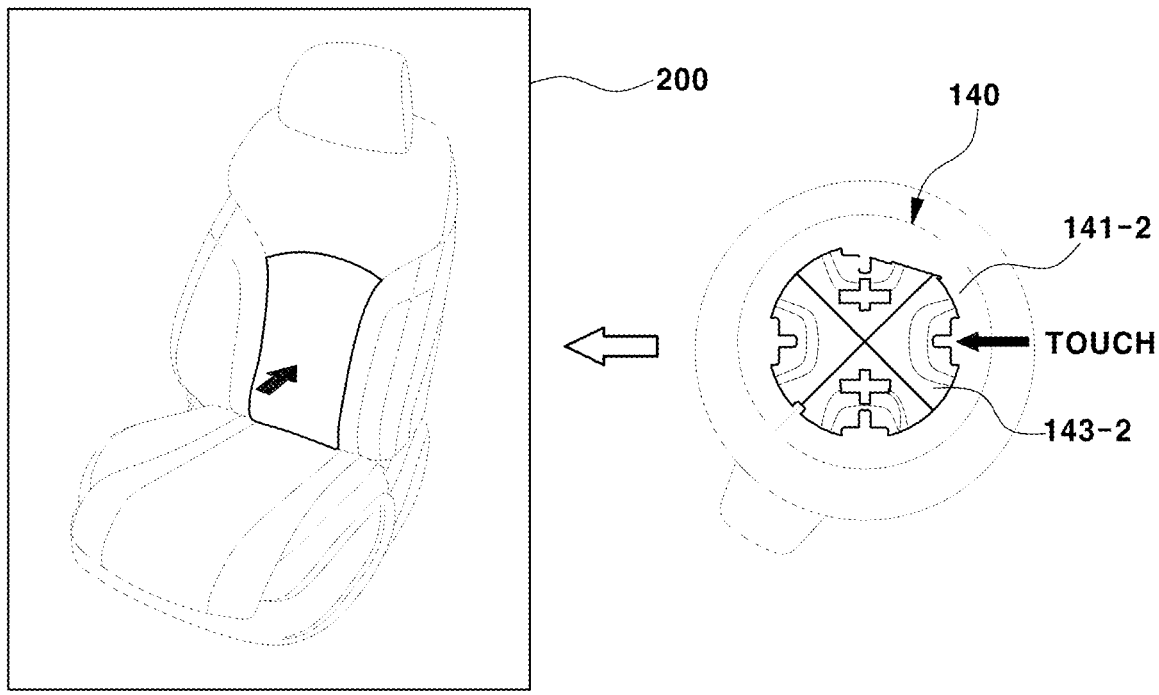

Subsequently, the main controller 114 transmits a display command control signal to the display 200 according to the signal determined as the lumbar support backward contraction direction so that, as shown in FIG. 14B, a seat image and one arrow image for guiding the lumbar support backward contraction operating direction may be displayed on the display 200.

Therefore, when the user takes a look at the display 200, the user may easily recognize that the lumbar support is operated to contract backward when pressing the fourth switch cover 141 in a state of currently touching the lumbar support backward contraction operation region 141-2 of the fourth switch cover 141.

Alternatively, when the user touches the lumbar support ascending operation region 141-3 of the fourth switch cover 141, sensing of the fourth-third touch sensor 143-3 in the lumbar support ascending operation region 141-3 is performed, and a sensing signal of the fourth-third touch sensor 143-3 is output to the main controller 114 through the flexible cable 115.

As such, the main controller 114 determines an operating direction of the power seat and an operating direction of the switch according to the sensing signal of the fourth-third touch sensor 143-3 as a lumbar support ascending direction thereof.

Figure 14C:
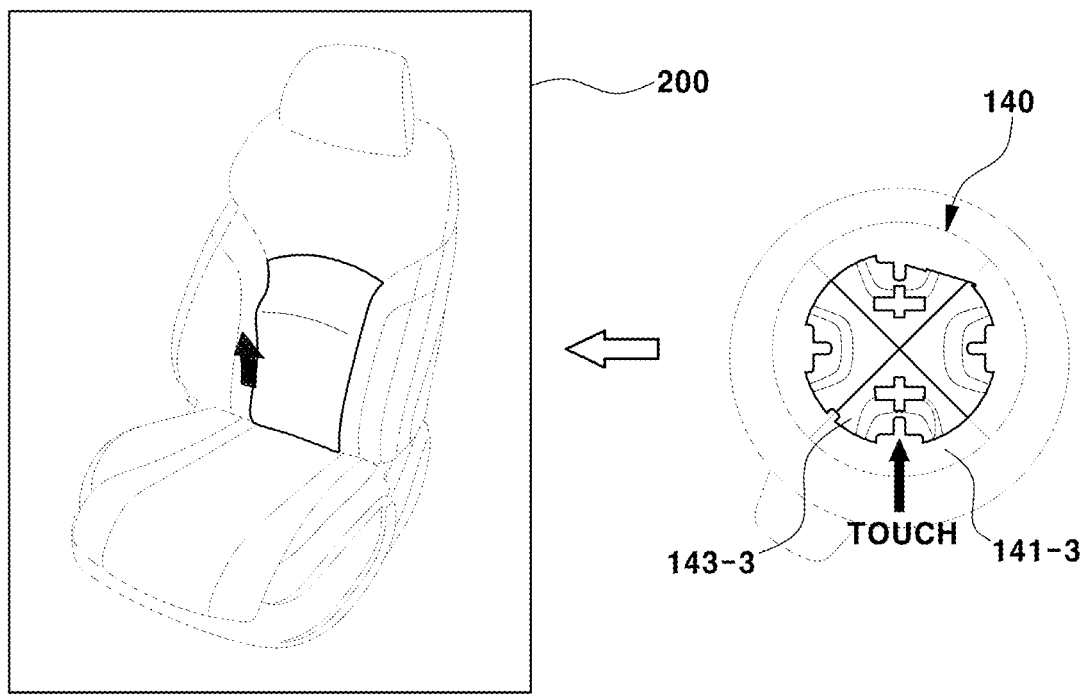

Subsequently, the main controller 114 transmits a display command control signal to the display 200 according to the signal determined as the lumbar support ascending direction so that, as shown in FIG. 14C, a seat image and one arrow image for guiding a lumbar support ascending operating direction may be displayed on the display 200.

Therefore, when the user takes a look at the display 200, the user may easily recognize that the lumbar support is operated to ascend when pressing the fourth switch cover 141 in a state of currently touching the lumbar support ascending operation region 141-3 of the fourth switch cover 141.

Alternatively, when the user touches the lumbar support descending operation region 141-4 of the fourth switch cover 141, sensing of the fourth-fourth touch sensor 143-4 in the lumbar support descending operation region 141-4 is performed, and a sensing signal of the fourth-fourth touch sensor 143-4 is output to the main controller 114 through the flexible cable 115.

Subsequently, the main controller 114 determines an operating direction of the power seat and an operating direction of the switch according to the sensing signal of the fourth-fourth touch sensor 143-4 as a lumbar support descending direction thereof.

Figure 14D:
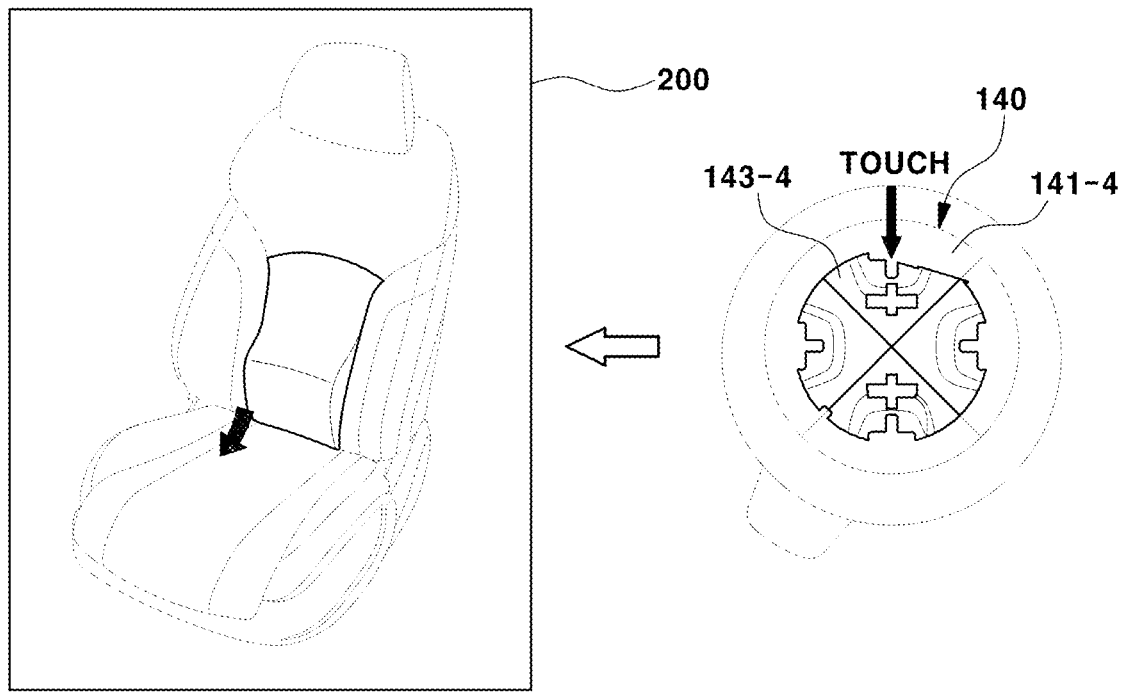

Subsequently, the main controller 114 transmits a display command control signal to the display 200 according to the signal determined as the lumbar support descending direction so that, as shown in FIG. 14D, a seat image and one arrow image for guiding a lumbar support descending operating direction may be displayed on the display 200.

Therefore, when the user takes a look at the display 200, the user may easily recognize that the lumbar support is operated to descend when pressing the fourth switch cover 141 in a state of currently touching the lumbar support descending operation region 141-4 of the fourth switch cover 141.

Figure 15:
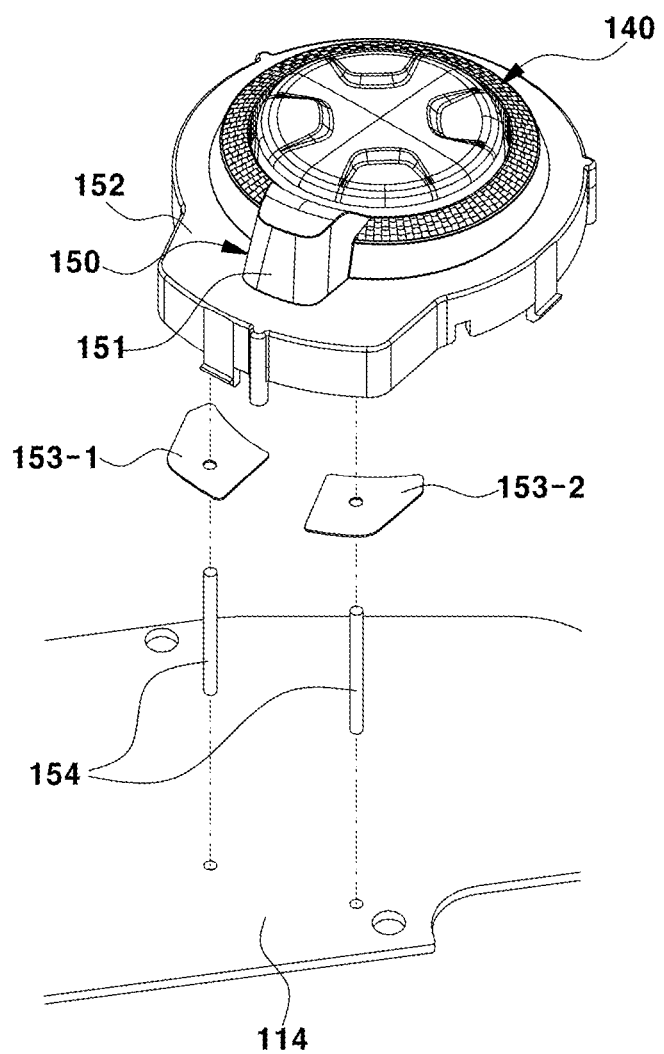
FIG. 15 and FIG. 16 are perspective views exemplarily illustrating a fifth switch of the switch module according to various exemplary embodiments of the present invention.
Figure 16:
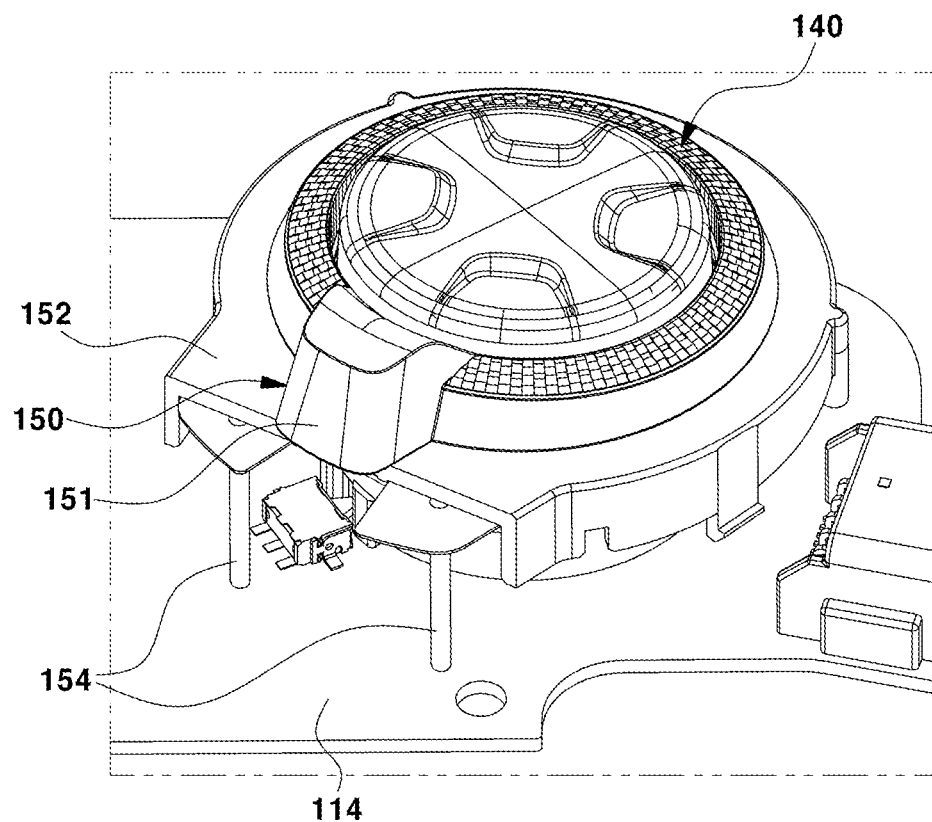

FIG. 15 and FIG. 16 are diagrams illustrating a fifth switch of the switch module and an assembled state thereof according to various exemplary embodiments of the present invention, and a reference numeral 150 denotes the fifth switch.

The fifth switch 150 of a rotation knob type is to activate a bolster angle adjustment operation of the seatback, and as shown in FIG. 15, the fifth switch 150 may include: a fifth switch cover 151 which is disposed to be angularly-rotatable at a position of an outer circumference of the fourth switch cover 141.

As shown in FIG. 15, a fifth-first touch sensor 153-1 is embedded in a garnish plate 152 adjacent to a side surface of the fifth switch cover 151, and a fifth-second touch sensor 153-2 is embedded in the garnish plate 152 adjacent to another side surface of the fifth switch cover 151.

In the instant case, the fifth-first touch sensor 153-1 and the fifth-second touch sensor 153-2 are connected to the main controller 114 to enable signal output through a conductive spring 154 or a conductive pin.

Thus, when the user touches the garnish plate 152 at a side of the fifth switch cover 151, sensing of the fifth-first touch sensor 153-1 in the fifth switch cover 151 is performed, and a sensing signal of the fifth-first touch sensor 153-1 is output to the main controller 114 through the conductive spring 154.

As such, the main controller 114 determines an operating direction of the power seat and an operating direction of the switch according to the sensing signal of the fifth-first touch sensor 153-1 as a bolster inward movement direction thereof.

Figure 17A:
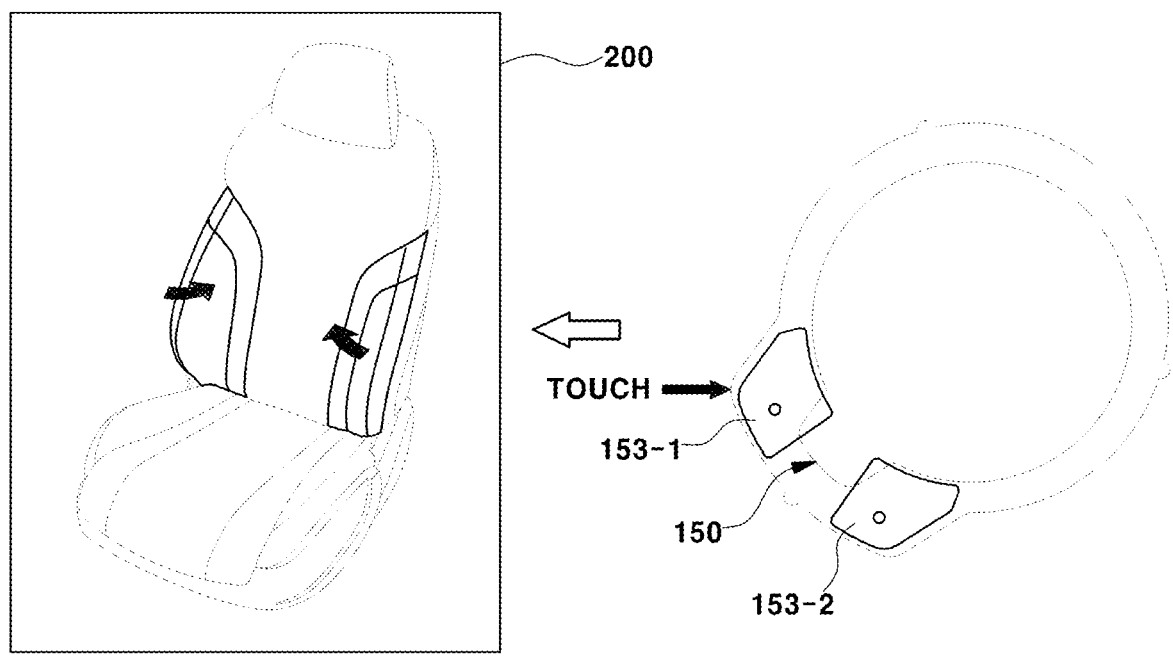
FIG. 17A and FIG. 17B are diagrams illustrating that images for guiding operating directions of the power seat are differently displayed on the display according to sensing of a touch sensor embedded in the fifth switch according to various exemplary embodiments of the present invention.

Subsequently, the main controller 114 transmits a display command control signal to the display 200 according to the signal determined as the bolster inward movement direction so that, as shown in FIG. 17A, a seat image and one arrow image for guiding a bolster inward movement operating direction may be displayed on the display 200.

Thus, when the user takes a look at the display 200, the user may easily recognize that a bolster may be moved and adjusted in an inward direction by currently rotating the bolster toward a side of the fifth switch cover 151.

Meanwhile, when the user touches the garnish plate 152 at another side of the fifth switch cover 151, sensing of the fifth-second touch sensor 153-2 in the fifth switch cover 151 is performed, and a sensing signal of the fifth-second touch sensor 153-2 is output to the main controller 114 through the conductive spring 154.

As such, the main controller 114 determines an operating direction of the power seat and an operating direction of the switch according to the sensing signal of the fifth-second touch sensor 153-2 as a bolster outward movement direction thereof.

Figure 17B:
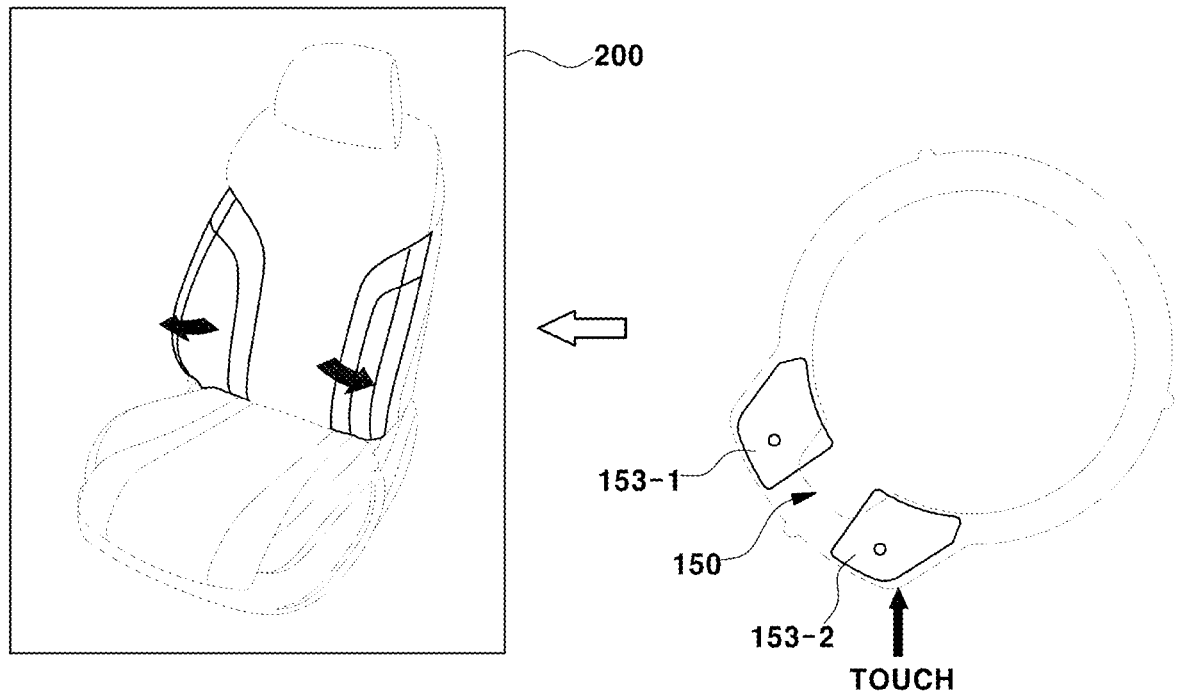
Figure 18:
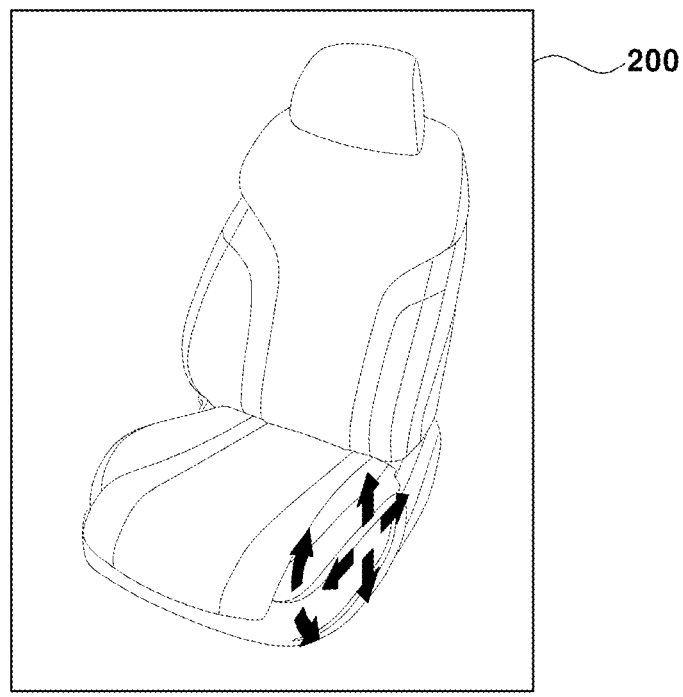
FIG. 18 is a schematic diagram illustrating an example in which an image for guiding an operating direction of a power seat is displayed on a display according to the related art.

Subsequently, the main controller 114 transmits a display command control signal to the display 200 according to the signal determined as the bolster outward movement direction so that, as shown in FIG. 17B, a seat image and an arrow image for guiding a bolster outward movement operating direction may be displayed on the display 200.

Thus, when the user takes a look at the display 200, the user may easily recognize that the bolster may be moved and adjusted in an outward direction by currently rotating the bolster toward another side of the fifth switch cover 151.

Meanwhile, when the user touches two or more touch sensors and thus two or more touch sensors simultaneously perform sensing operations, two or more arrows for guiding the operating direction of the power seat and the operation direction of the switch may be displayed on the display 200.

Thus, the user may accurately recognize a current switch selection state, the current operating direction of the switch, and the current operating direction of the power seat according to the operation of the switch while looking at the power seat and an arrow image which are displayed on the display 200 so that switch operating convenience of the user may be improved.

Various aspects of the present invention provide the following effects through the above-described problem solving means.

First, a plurality of touch sensors is embedded in switches of a switch module for an operation of the power seat, and an arrow for guiding an operating direction of the power seat and an operating direction of the switch is accurately displayed on a display according to a sensing operation of each of the touch sensors so that a user can accurately recognize the operating direction of the switch for operating the power seat to a target position and the operating direction of the power seat according to the switch operation.

Second, the user can accurately recognize a switch selection state, the operating direction of the switch, and the operating direction of the power seat according to the operation of the switch while looking at the power seat and an arrow image which are displayed on the display so that switch operating convenience of the user may be improved.

In addition, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

In an exemplary embodiment of the present invention, each operation described above may be performed by a control device, and the control device may be configured by multiple control devices, or an integrated single control device.

In an exemplary embodiment of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A device having a plurality of push button switches for operating a power seat of a vehicle, the device comprising:
    a switch module in which the plurality of push button switches for an input operation to drive the power seat to a target position and in a target direction are modularized;
    a plurality of touch sensors embedded in the plurality of push button switches and configured to indicate operating directions of the power seat;
    a main controller configured to determine an operating direction of the power seat according to a sensing signal from a touch sensor in which a touch sensing operation is performed among the plurality of touch sensors; and
    a display configured to display the operating direction of the power seat determined by the main controller as one arrow and visually guide a user,
    wherein the plurality of push button switches of the switch module includes:
        a first push button switch configured to activate a forward movement operation and a backward movement operation of the power seat, an up operation and a down operation of a front portion of a seat cushion, and a vertical height adjustment operation of the power seat;
        a second push button switch to activate a reclining operation of a seatback;
        a third push button switch configured to activate an extension operation of the front portion of the seat cushion; and
        a fourth push button switch configured to activate a support direction adjustment operation of a lumbar support,
    wherein the switch module further includes a fifth rotation knob switch configured to activate a bolster angle adjustment operation of the seatback, and
    wherein the first push button switch, the second push button switch, the third push button switch, the fourth push button switch, and the fifth rotation knob switch are disposed in a predetermined arrangement.

2. The device of claim 1, wherein the first push button switch includes:
    a first switch cover in which a first push button and a second push button which are configured to activate the forward and backward movement operations of the power seat, a third push button and a fourth push button which are configured to activate the up and down operations of the front portion of the seat cushion, and a fifth push button and a sixth push button which are configured to activate the vertical height adjustment operation of the power seat are formed in a predetermined arrangement;
    a first plurality of touch sensors provided in areas of the first push button, the second push button, the third push button, the fourth push button and the six push button among the plurality of touch sensors; and
    a first elevation block having an upper portion coupled to the first switch cover and a lower portion mounted on the main controller to be pressable.

3. The device of claim 2, wherein the first plurality of touch sensors includes:
    a first-first touch sensor embedded in a predetermined area of the first push button of the first switch cover for the forward movement operation of the power seat and connected to the main controller to enable signal transmission;
    a first-second touch sensor embedded in a predetermined area of the second push button of the first switch cover for the backward movement operation of the power seat and connected to the main controller to enable signal transmission;
    a first-third touch sensor embedded in a predetermined area of the third push button of the first switch cover for the up operation of the front portion of the seat cushion and connected to the main controller to enable signal transmission;
    a first-fourth touch sensor embedded in a predetermined area of the fourth push button of the first switch cover for the down operation of the front portion of the seat cushion and connected to the main controller to enable signal transmission;
    a first-fifth touch sensor embedded in a predetermined area of the fifth push button of the first switch cover for a seat ascending operation of the power seat and connected to the main controller to enable signal transmission; and
    a first-sixth touch sensor embedded in a predetermined area of the sixth push button of the first switch cover for a seat descending operation of the power seat and connected to the main controller to enable signal transmission.

4. The device of claim 2, wherein the first plurality of touch sensors is connected to the main controller to enable signal transmission through a flexible cable.

5. The device of claim 2, wherein a tact switch pressed by a bottom portion of the first elevation block when the first elevation block descends is mounted on the main controller.

6. The device of claim 1, wherein the second push button switch includes:
    a second switch cover in which a seventh push button configured to activate a forward reclining operation of the seatback and an eighth push button configured to activate a backward reclining operation of the seatback are formed;
    a second plurality of touch sensors among the plurality of touch sensors, wherein the second plurality of touch sensors includes:

a second-first touch sensor embedded in a predetermined area of the seventh push button of the second switch cover for the forward reclining operation of the seatback and connected to the main controller to enable signal transmission; and
a second-second touch sensor embedded in a predetermined area of the eighth push button of the second switch cover for the backward reclining operation of the seatback and connected to the main controller to enable signal transmission; and
a second elevation block having an upper portion coupled to the second switch cover and a lower portion mounted on the main controller to be pressable.

7. The device of claim 6, wherein the second-first touch sensor and the second-second touch sensor are connected to the main controller to enable signal transmission through a conductive spring.

8. The device of claim 1, wherein the third push button switch includes:
a third switch cover in which a ninth push button configured to activate a forward extension operation of the front portion of the seat cushion and a tenth push button configured to activate a backward extension operation of the front portion of the seat cushion are formed;
a third plurality of touch sensors among the plurality of touch sensors, wherein the third plurality of touch sensors includes:
a third-first touch sensor embedded in a predetermined area of the ninth push button of the third switch cover for the forward extension operation of the front portion of the seat cushion and connected to the main controller to enable signal transmission; and
a third-second touch sensor embedded in a predetermined area of the tenth push button of the third switch cover for the backward extension operation of the front portion of the seat cushion and connected to the main controller to enable signal transmission; and
a third elevation block having an upper portion coupled to the third switch cover and a lower portion mounted on the main controller to be pressable.

9. The device of claim 8, wherein the third-first touch sensor and the third-second touch sensor are connected to the main controller to enable signal transmission through a conductive spring.

10. The device of claim 1, wherein the fourth push button switch includes:
a fourth switch cover divided into a lumbar support forward protruding operation region, a lumbar support backward contraction operation region, a lumbar support ascending operation region, and a lumbar support descending operation region; and
a fourth plurality of touch sensors among the plurality of touch sensors, wherein the fourth plurality of touch sensors includes:
a fourth-first touch sensor embedded in the lumbar support forward protruding operation region of the fourth switch cover and connected to the main controller to enable signal transmission;
a fourth-second touch sensor embedded in the lumbar support backward contraction operation region of the fourth switch cover and connected to the main controller to enable signal transmission;
a fourth-third touch sensor embedded in the lumbar support ascending operation region of the fourth switch cover and connected to the main controller to enable signal transmission; and
a fourth-fourth touch sensor embedded in the lumbar support descending operation region of the fourth switch cover and connected to the main controller to enable signal transmission.

11. The device of claim 10, wherein an integrated signal output path of the fourth-first touch sensor, the fourth-second touch sensor, the fourth-third touch sensor, and the fourth-fourth touch sensor is connected to the main controller to enable signal transmission through a flexible cable.

12. The device of claim 1, wherein the fifth rotation knob switch includes:
a fifth switch cover mounted at a predetermined position on a circumference of a fourth switch cover;
a fifth-first touch sensor embedded in a garnish plate adjacent to a first side of the fifth switch cover and connected to the main controller to enable signal output; and
a fifth-second touch sensor embedded in the garnish plate adjacent to a second side of the fifth switch cover and connected to the main controller to enable signal output.

13. The device of claim 12, wherein the fifth-first touch sensor and the fifth-second touch sensor are connected to the main controller to enable signal transmission through a conductive spring.

* * * * *